(12) United States Patent
Naven

(10) Patent No.: US 7,096,376 B2
(45) Date of Patent: Aug. 22, 2006

(54) DEVICE AND METHOD FOR ENSURING THAT A SIGNAL ALWAYS REACHES ITS DESTINATION AFTER A FIXED NUMBER OF CLOCK CYCLES

(75) Inventor: Finbar Naven, Cheadle Hulme (GB)

(73) Assignee: Fujitsu Limited, Kawasaki (JP)

( * ) Notice: Subject to any disclaimer, the term of this patent is extended or adjusted under 35 U.S.C. 154(b) by 469 days.

(21) Appl. No.: 10/163,457

(22) Filed: Jun. 7, 2002

(65) Prior Publication Data

US 2003/0038665 A1   Feb. 27, 2003

(30) Foreign Application Priority Data

Aug. 24, 2001   (GB) ................. 0120717.4

(51) Int. Cl.
*G06F 1/04* (2006.01)

(52) U.S. Cl. .................. 713/401; 713/600; 327/149

(58) Field of Classification Search ................ 713/401, 713/600; 327/152, 158, 149; 365/194
See application file for complete search history.

(56) References Cited

U.S. PATENT DOCUMENTS

| | | | | |
|---|---|---|---|---|
| 5,057,701 | A | * | 10/1991 | Miller, Jr. .................... 327/292 |
| 5,087,829 | A | * | 2/1992 | Ishibashi et al. ............ 327/152 |
| 5,115,455 | A | | 5/1992 | Samaras et al. |
| 5,371,417 | A | * | 12/1994 | Mirov et al. ................. 327/115 |
| 5,467,464 | A | | 11/1995 | Oprescu et al. |
| 5,498,983 | A | * | 3/1996 | Schoellkopf .................... 327/3 |
| 5,872,959 | A | | 2/1999 | Nguyen et al. |
| 6,081,142 | A | * | 6/2000 | Douchi et al. ................ 327/158 |
| 6,114,890 | A | * | 9/2000 | Okajima et al. ............. 327/170 |
| 6,240,523 | B1 | * | 5/2001 | Rogers ........................ 713/400 |

(Continued)

FOREIGN PATENT DOCUMENTS

EP   0 903 660 A1   3/1999

(Continued)

OTHER PUBLICATIONS

Idda et al. "Analysis of High-Speed GaAs Source-coupled FET Logic Circuits", IEEE Transaction on Microwave Theory and Techniques, vol. Mtt-32, No. 1, Jan. 1984, pp. 5-10.*

(Continued)

*Primary Examiner*—Chun Cao
(74) *Attorney, Agent, or Firm*—Staas & Halsey LLP

(57) ABSTRACT

In a semiconductor integrated circuit device (700) in which variation in a minimum propagation time of a transmission signal from a source node (SN) to a destination node (DN) is sufficiently large, relative to a clock period (T) at an intended clock frequency of the device, to cause variation in a clock cycle in which the transmission signal reaches the destination node (DN) a plurality of clocked elements ($800_0$ to $800_3$) are connected in series between the source and destination nodes for causing a shift signal ($SS_0$ to $SS_4$), representing the transmission signal present at the source node (SN) in a first clock cycle, to be shifted from the source node (SN) to the destination node (DN) through the series of clocked elements ($800_0$ to $800_3$) one clocked element ($800_i$) per predetermined number of clock cycles. The series of clocked elements ($800_0$ to $800_3$) is connected and arranged such that variation ($v_i$) in a propagation time of the shift signal ($SS_i$) from one clocked element ($800_{i-1}$) to the next clocked element ($800_i$) is sufficiently small, relative to the clock period (T), that a clock cycle in which the shift signal ($SS_i$) reaches the next clocked element ($800_i$) does not vary, whereby the shift signal ($SS_4$) always reaches the destination node (DN) a fixed number of clock cycles after the first clock cycle.

21 Claims, 14 Drawing Sheets

U.S. PATENT DOCUMENTS 6,476,615 B1 * 11/2002 Marbot et al. .............. 324/537
6,556,488 B1 * 4/2003 Han .......................... 365/194
6,557,066 B1 * 4/2003 Crafts et al. ................ 710/305

FOREIGN PATENT DOCUMENTS

| EP | 1 056 018 | 5/2000 |
|---|---|---|
| JP | 6-348363 | 12/1994 |
| JP | 2000-208632 | 7/2000 |
| WO | WO 00/33200 | 6/2000 |

OTHER PUBLICATIONS

English language Search Report for United Kingdom Application GB 0120717.4.

* cited by examiner

DEVICE AND METHOD FOR ENSURING THAT A SIGNAL ALWAYS REACHES ITS DESTINATION AFTER A FIXED NUMBER OF CLOCK CYCLES

BACKGROUND OF THE INVENTION

1. Field of the Invention

The present invention relates to the distribution of signals in high-speed digital circuitry, particularly where the variation in the propagation delay to various parts of the circuitry is relatively large in relation to timing constraints imposed on the operation of the circuitry by, for example, a fast system clock.

2. Description of the Related Art

FIG. 1 of the accompanying drawings shows a printed circuit board (PCB) 1 carrying a source chip 2 and a destination chip 3. Signal producing circuitry 4 on the source chip 2 generates n individual channels of data D0 to Dn–1 which are communicated respectively to n signal processing circuitry portions $5_0$ to $5_{n-1}$ on the destination chip 3 via n respective output pins $6_0$ to $6_{n-1}$ of the source chip 2, n respective connection lines $8_0$ to $8_{n-1}$ connecting the source chip 2 with the destination chip 3 and n respective input pins $7_0$ to $7_{n-1}$ of the destination chip 3. Each of the data channels D0 to Dn–1 is a serial stream of 1-bit data which is synchronised in the source chip 2 with a clock signal CK generated within the signal producing circuitry 4.

In the FIG. 1 example, the distance "a" separating the source chip 2 and the destination chip 3 is relatively small, for example of the order of 2 to 3 cm, making it feasible to operate a synchronous interface between the two chips. With a synchronous interface, each of the serial data channels D0 to D–1 is synchronised on the source chip 2 with the clock signal CK generated on the source chip 2, and the clock signal CK is itself communicated from the source chip 2 to the destination chip 3 via an output pin $6_{CK}$ on the source chip 2, a connection line $8_{CK}$ and an input pin $7_{CK}$ on the destination chip 3. Since the separation "a" between the source chip 2 and the destination chip 3 is relatively small, the relative timings of the signals communicated between the chips are not influenced too greatly by variations in interconnect loading and therefore the data channels D0 to Dn–1 can be expected to exhibit a reasonable degree of synchronicity with the clock signal CK upon their arrival at the input pins 7 of the destination chip 3. Were an asynchronous interface to be used instead, where the clock signal CK is not communicated from the source chip 2 to the destination chip 3, n separate clock recovery circuits would be required on the destination chip 3 in order to recover n respective individual clocks from the n separate data channels D0 to Dn–1, with consequent problems relating to the realignment of the data channels.

The clock signal CK which is received at the input pin $7_{CK}$ of the destination chip 3 is distributed to each of the signal processing circuitry portions $5_0$ to $5_{n-1}$ for use in controlling the timing of operations by those circuitry portions.

A reset signal R is also produced by the signal producing circuitry 4 of the source chip 2 which is used to reset each of the circuitry portions 5. This reset signal R is also communicated from the source chip 2 to the designation chip 3 via an output pin $6_R$ of the source chip 2, a connection line $8_R$ and an input pin $7_R$ of the destination chip 3. From the input pin $7_R$ the reset signal R is distributed to each of the signal processing circuitry portions $5_0$ to $5_{n-1}$.

The input pins $7_0$ to $7_{n-1}$ are separated from each other by a distance "b". Circuitry layout and signal distribution considerations dictate that each of the n signal processing circuitry portions $5_0$ to $5_{n-1}$ is advantageously positioned as close as possible to its corresponding input pin 7, with the n signal processing circuitry portions $5_0$ to $5_{n-1}$ being laid out in a line substantially parallel with the line of input pins $7_0$ to $7_{n-1}$ and with each of the signal processing circuitry portions $5_0$ to $5_{n-1}$ being opposite its corresponding input pin 7. Therefore the distance "c" separating the signal processing circuitry portions 5 from one another is advantageously substantially the same as the pin separation "b". The distance between the first signal processing circuitry portion $5_0$ and the last signal processing circuitry portion $5_{n-1}$ is "d", or approximately (n–1)*c.

In a typical application, the pin separation "b", and therefore also the separation "c" between adjacent signal processing circuitry portions 5, is of the order of 0.5 mm. With sixteen channels of data D0 to D15, and sixteen corresponding signal processing circuitry portions $5_0$ to $5_{15}$, the overall separation "d" between the first and final signal processing circuitry portions $5_0$ and $5_{15}$ is of the order of 8 mm. The overall dimensions of such a destination chip 3 would be of the order of 10 mm by 10 mm.

With a destination chip 3 having such dimensions, the capacitive and resistive loading of the interconnect wiring between the input pins 7 and the signal processing circuitry portions 5 is highly significant, and even at moderate clock frequencies this leads to relatively large and highly variable signal transition times (i.e. unpredictable signal propagation delays). Consequently, some sort of signal distribution and buffering network is required to control the propagation of signals from the input pins 7 to the signal processing circuitry portions 5 in the destination chip 3.

FIG. 2(A) of the accompanying drawings shows a simple example of a clock distribution tree which can be used in the destination chip 3 of FIG. 1 to route the received clock signal CK from the clock input pin $7_{CK}$ to each of four signal processing circuitry portions $5_0$ to $5_3$. In the example shown in FIG. 2(A), only four signal processing circuitry portions $5_0$ to $5_3$ are shown for ease of illustration. The clock distribution circuitry 9 of FIG. 2(A) comprises ten buffers $10_0$ to $10_9$ arranged in a tree-like formation with a single buffer $10_0$ at the root of the tree and four buffers $10_3$, $10_6$, $10_8$ and $10_9$ at the ends of the tree branches. The received clock signal CK branches into four separate clock signals CK0 to CK3 which are input to respective signal processing circuitry portions $5_0$ to $5_3$.

FIG. 2(B) of the accompanying drawings shows similar distribution circuitry 11 for distribution of the received reset signal R. The reset signal distribution circuitry 11 also comprises ten buffers $12_0$ to $12_9$ arranged in a similar configuration to the ten buffers $10_0$ to $10_9$ of FIG. 2(A).

Each of the signals CK0/R0 to CK3/R3 in FIGS. 2(A)/2(B) propagates through a different set of four buffers. For example, clock signal CK1 arrives at its destination having travelled through buffers $10_0$, $10_4$, $10_7$ and $10_8$. Each signal therefore passes through the same number of buffers to arrive at its destination. The wiring portions are not all of the same length, which leads to some small differences in propagation time amongst the signals CK0 to CK3 and amongst the signals R0 to R3. However, provided that the wiring propagation times are small in comparison with the switching times of the buffers, the signals CK0 to CK3 and R0 to R3 arrive at the signal processing circuitry portions without significant timing differences.

In practice a more efficient distribution tree having fewer buffering stages than those illustrated in FIGS. 2(A) and 2(B) would be used. However, even with signal distribution arrangements where measures have been taken to equalise the path lengths and propagation delays of each of the signals CK0 to CK3 or R0 to R3, there can be substantial differences, i.e. skew, in the arrival times of different clock signals CK and different reset signals R at the signal processing circuitry portions 5. This is because the path taken through the distribution network by one of the signals CK0 to CK3 in FIG. 2(A) or R0 to R3 in FIG. 2(B) is different to the path taken by another such signal, with each signal travelling through a different set of buffers. As a consequence, the overall delay of each distributed signal will be different. Furthermore, even when a single signal is considered, there can be substantial variation, i.e. jitter, in its arrival time at its particular intended signal processing circuitry portion 5. There are several reasons for such skew and jitter.

Firstly, manufacturing or process variations will result in variations between the size or strength of the individual buffers, their switch times, and their loading effects. Such process variations will tend to be small across a single chip but can be much larger from one chip to another. Secondly, there will be random or systematic variations in supply voltage applied to each of the individual buffers, for example up to ±5%. Thirdly, there will be variation in the operating temperature at different parts of the circuitry and from device to device. Such temperature variations will tend to be small across a single chip at any one time but the circuitry may be required to operate over a wide range of operating temperatures, for example from −40° C. to +125° C. These uncertainties in operating conditions are referred to generally as "process-voltage-temperature" variations, or PVT variations.

PVT variation within a single device results in timing skew or jitter being manifested in the signals at the end of a distribution network such as that of FIG. 2(A) or FIG. 2(B), which can typically be of the order of 15% of the overall distribution delay which is experienced by a signal through the distribution network, even between adjacent distributed signals. Electrical (voltage) variations tend to dominate this "local" PVT variation since temperature and process variations tend to be small across a single device at any one time. For example, a fluctuating supply voltage may lead to fluctuating signal rise and fall times, which will result in jitter.

"Global" PVT variations, which are PVT variations from one device to another or from one time to another in a single device, also have significant timing implications. For example the propagation time of a particular signal in a device will change markedly as the operating temperature of the device varies between, for example, −40° C. and +125° C., and process variations between devices will also have a significant effect.

In the context of clocked circuitry such as that shown in FIG. 1, these local and global PVT variations can be large enough to make it impossible to guarantee that a signal will arrive at its destination in a predetermined clock cycle, for example. This problem becomes particularly serious where the frequency of the clock signal is very high, bordering on the maximum speed of operation of the circuit elements making up the circuitry, for example of the order of 600 or 700 MHz for a 0.18 μm CMOS process.

FIGS. 3(A) to 3(C) illustrate these effects of local and global PVT variation on the timing characteristic of a distributed clock signal. FIG. 3(A) shows the received clock signal CK at the clock input pin $7_{CK}$. The clock signal has a clock cycle period of T. The delay effects will be illustrated with reference to the rising edge E of the clock signal CK of FIG. 3(A). All timing values are measured with respect to the 50% amplitude threshold of a rising edge.

FIG. 3(B) illustrates the delay of a distributed clock signal (for example CK3 of FIG. 2(A)) with PVT conditions at one extreme of the global PVT variation range for a particular set of tolerances. The minimum delay time Tf in the rising edge under these conditions is illustrated by the solid-line rising edge f of FIG. 3(B). Local PVT variations as explained above will also cause a timing jitter Jf of approximately 15% of the overall minimum PVT delay Tf, so that while a clock signal distributed to one part of the circuitry (for example CK3 of FIG. 2(A)) may be delayed by a time Tf, another clock signal distributed to a different part of the circuitry (for example CK0 of FIG. 2(A)) may be delayed by a different time Tf* with respect to the rising edge E. The maximum delay time for the same set of extreme global PVT conditions is illustrated by the dashed-line rising edge f* in FIG. 3(B).

FIG. 3(C) shows the delay experienced by the rising edge of clock signal CK with PVT conditions at the other extreme of the global PVT tolerance range, that is to say the maximum global PVT delay. The maximum delay experienced by the rising edge E under these conditions is Ts, as illustrated by the solid-line rising edge s of FIG. 3(C). Local PVT variation causes jitter Js between different clock signals of approximately 15% of Ts, so that for clock signals distributed to different parts of the circuitry the rising edge delay time could be any time between Ts* and Ts when the PVT conditions are at this end of the PVT tolerance range.

Referring to the timing symbols of FIGS. 3(A) to 3(C), in one practical example of clock distribution circuitry the clock signal CK has a frequency of 673 MHz, so that the clock cycle period T is 1.48 ns. The minimum clock delay Tf is 720 ps, so that Tf* (=Tf+15%) is 830 ps. The clock distribution jitter Jf in these circumstances is then 110 ps. The rising edge time is of the order of 180 ps. The maximum clock delay Ts in this example is 1830 ps, so that Ts* (=Ts−15%) is 1555 ps. The clock distribution jitter Js in these circumstances is then 275 ps. The rising edge speed is of the order of 280 ps.

It can be seen from the above illustration with reference to FIGS. 3(A) to 3(C) that the clock distribution delay can actually be longer than the clock cycle period T, with the time overshoot Tp of FIG. 3(C) varying from 75 ps to 350 ps under "maximum delay" PVT conditions. The clock distribution delay can also be as low as 720 ps, which is less than half a clock cycle period, under "minimum delay" PVT conditions.

Since the reset signal R is also distributed in a similar way to the clock signal CK (see FIGS. 2(A) and 2(B)), the reset signal R also exhibits wide variation in propagation delay. The adverse consequences of these variations in propagation delay across PVT will now be illustrated with reference to FIGS. 4(A) to 4(C) of the accompanying drawings.

FIG. 4(A) shows the clock signal CK and the reset signal R which are received at the input pins $7_{CK}$ and $7_R$ respectively of the destination chip 3 of FIG. 1. The first clock cycle CYCLE 1 commences with the rising edge E of the clock signal CK. Suppose that the clock signal CK and reset signal R are intended to be used as the clock and reset inputs respectively of a register. The reset signal must be present and stable a minimum set-up time $t_s$ before the rising edge of the clock signal CK.

FIG. 4(B) shows the clock signal $CK_A$ and reset signal $R_A$ which are received at one of the signal processing circuitry portions 5 of FIG. 1 after distribution through circuitry such as that shown in FIGS. 2(A) and 2(B). In the FIG. 4(B) example, the clock signal $CK_A$ is delayed by a time $dCK_A$ with respect to the original clock signal CK. The reset signal $R_A$ is delayed by a time $dR_A$ with respect to the original reset signal R. In the FIG. 4(B) example, the clock delay $dCK_A$ and reset delay $dR_A$ are approximately the same, with the result that the rising edge in $R_A$ occurs more than the set-up time $t_s$ before the rising clock edge A of the clock signal $CK_A$ in CYCLE 1 of FIG. 5(B). Thus, as intended the reset signal given in CYCLE 1 of FIG. 5(A) causes the register to be reset at the rising edge A.

FIG. 4(C) illustrates the clock signal $CK_B$ and reset $R_B$ which are received at a different one of the signal processing circuitry portions 5 of FIG. 1 within the same destination chip 3. The clock signal $CK_B$ is delayed by a time $dCK_B$ with respect to the original clock signal CK, and the reset signal $R_B$ is delayed by a time $dR_B$ with respect to the original reset signal R. In the FIG. 4(C) example, the clock delay $dCK_B$ is approximately equivalent to the delay $dCK_A$ experienced by clock signal $CK_A$ of FIG. 4(B), but due to PVT variations the delay $dR_B$ experienced by the reset signal $R_B$ is greater than the delay $dR_A$ experienced by the reset signal $R_A$ of FIG. 4(B). In the FIG. 4(C) example, the reset signal $R_B$ has been delayed to such an extent that it would no longer meet the set-up time $t_s$ of the register in CYCLE 1 of FIG. 4(C). Thus the register would not be reset until the rising edge B.

It is apparent from FIGS. 4(B) and 4(C) that due to PVT variations the clock cycle in which the reset signal reaches its destination can vary. This variation can occur even where there is no clock variation or jitter at all, the variation in the clock cycle timing of arrival arising entirely from the variation in the propagation time of the reset signal itself. The variation is of course exacerbated when clock timing variations, which inevitably also occur in practice, are taken into account. This is true even though the clock and reset distribution trees of FIGS. 2(A) and 2(B) are matched such that the delay of each distributed clock signal CK0 to CKn−1 nominally matches the delay of its corresponding distributed reset signal R0 to Rn−1. In practice, the matching of delays is only precisely possible for a particular set of PVT conditions, and cannot always be achieved across the entire range of PVT conditions. Therefore circuitry which may be operating correctly at one particular point in the PVT range may not operate correctly at a later time when, for example, the temperature has drifted higher over that period of time.

This timing problem can also arise even if the reset signal R is synchronised to one of the rising edges of the clock signals CK, for example by synchronising circuitry connected with the clock and reset input pins $7_{CK}$ and $7_R$ in FIG. 1. In this case, as shown in FIG. 5(A) of the accompanying drawings the rising edge of the reset signal R is synchronised with the rising edge E of the clock signal CK in CYCLE 1. FIG. 5(B) of the accompanying drawings shows the situation where the clock signal $CK_A$ is delayed with respect to the original clock signal CK by a relatively large time $dCK_A$, which is larger than the overall clock cycle period. On the other hand, the reset signal $R_A$ is delayed by a shorter time $dR_A$ with respect to the original reset signal R, the difference between $dR_A$ and $dCK_A$ arising from PVT variations. As a result the reset signal is received at the register at a time which meets the set-up requirements of the register in CYCLE 0 of FIG. 5(B), which is the cycle preceding the CYCLE 1 in which the reset signal was given in FIG. 5(A). Thus the register would be reset on rising edge B rather than rising edge A of the clock signal $CK_A$, as intended.

Although FIGS. 1 to 5 have illustrated the problems of distribution of a signal from a source node of a chip to a plurality of destination nodes on a chip the same problem will also arise even when a reset signal (or other such signal) is being distributed from a source node to a single destination node. For example, although FIGS. 4(B) and 4(C) were described above as showing the timing of a clock signal CK and reset signal R distributed from a single node point to two different destination nodes A and B within the same circuitry, those figures could also represent the timing of signals distributed from a source node to a single destination point at two different times A and B for the same device, or between equivalent source and destination nodes in two different devices A and B.

The problem will arise in any device in which variation in a minimum propagation time of a transmission signal, such as a reset signal as described above, from a source node to a destination node is sufficiently large, relative to a clock period at an intended clock frequency of the device, to cause variation in a clock cycle in which the transmission signal reaches the destination node. In practice, a transmission path between the source and destination nodes having the minimum propagation time may be exclusively passive (wiring portions or tracking), or may include active elements such as gates or buffers. The minimum propagation time relates to the fastest practically-realisable such transmission path for a particular device.

SUMMARY OF THE INVENTION

The present invention can be applied to a semiconductor integrated circuit device in which variation in a minimum propagation time of a transmission signal from a source node to a destination node is sufficiently large, relative to a clock period at an intended clock frequency of the device, to cause variation in a clock cycle in which the transmission signal reaches the destination node. An embodiment of one aspect of the present invention provides the device with a plurality of clocked elements connected in series between the source and destination nodes. These clocked elements cause a shift signal, representing the transmission signal present at the source node in a first clock cycle, to be shifted from the source node to the destination node through the series of clocked elements one clocked element per predetermined number of clock cycles. The series of clocked elements are connected and arranged such that variation in a propagation time of the shift signal from each clocked element to the next clocked element is sufficiently small, relative to the clock period, that a clock cycle in which the shift signal reaches the next clocked element does not vary. In this way the shift signal always reaches the destination node a fixed number of clock cycles after the first clock cycle.

In a semiconductor integrated circuit device in which variation in a minimum propagation time of a transmission signal from a source node to a destination node is sufficiently large, relative to a clock period at an intended clock frequency of the device, to cause variation in a clock cycle in which the transmission signal reaches the destination node, an embodiment of another aspect of the present invention provides a method of propagating the transmission signal from the source node to the destination node. In this method a plurality of clocked elements are arranged in series between the source and destination nodes. A shift signal, representing the transmission signal present at the source node in a first clock cycle, is caused to be shifted from the source node to the destination node through the series of clocked elements one clocked element per predetermined number of clock cycles. The clocked elements are arranged such that variation in a propagation time of the shift signal from each clocked element to the next clocked element is sufficiently small, relative to the clock period, that a clock cycle in which the shift signal reaches the next clocked element does not vary, whereby the shift signal always reaches the destination node a fixed number of clock cycles after the first clock cycle.

A device embodying the invention can guarantee correct timing over a wide range of operating conditions and over relatively large distribution distances, even as clock frequencies become progressively higher, and can be used when a spacing between the source node and the (furthest) destination node is greater than the physical distance that could be reliably covered using a single combinatorial (plural-link) distribution chain.

The minimum propagation time can be considered to be the product of the source node-destination node spacing and a measure of the signal propagation delay per unit length for the device. In practice the signal propagation delay per unit length is affected by such factors as the fabrication technology being used (for example, silicon, silicon-germanium, gallium-arsenide), the type of process (for example, ECL or CMOS), the fabrication scale (for example, 0.18 μm or 0.11 μm), the number of buffers and gates in the combinatorial distribution chain from the source node to the destination node, the switch time of those buffers and gates, the loading presented by the interconnect, the input loading of the buffers and gates, the drive strength of the buffers and gates, and the drive voltages used.

An embodiment of the present invention is useful when the variation in the minimum propagation time is greater than 5% of the clock period at the intended clock frequency, is particularly useful then the variation in the minimum propagation time is greater than 15% of the clock period at the intended clock frequency, and is especially useful then the variation in the minimum propagation time is greater than 40% or more of the clock period at the intended clock frequency.

In one example, the variation in the minimum propagation time is approximately 15% of the minimum propagation time, although it can also be as low as 5% of the minimum propagation time and as high as 25% of the minimum propagation time, or more.

In an embodiment of the invention implemented in silicon with a 0.18 μm process and having an intended clock frequency of more than 500 MHz, reliable delivery of the transmission signal is achievable when the source node-destination node spacing is greater than 20,000 times a fabrication scale of the integrated circuit device, and even when the spacing is greater than 40,000 times a fabrication scale of the integrated circuit device. Different factors will apply for different materials, processes, etc.

In one embodiment implemented in silicon with a 0.18 μm process the intended clock frequency is higher than 500 MHz and the source node-destination node spacing is greater than 4 mm.

In one example, the minimum propagation time is at least half the clock period at the intended clock frequency.

In another example, reliable delivery of the transmission signal is possible when the source node-destination node spacing is more than Y times the clock period at said intended clock frequency, where for a silicon 0.18 μm process Y is 2,500,000 metres per second, and is even possible where Y is 5,000,000 metres per second. Different factors will apply for different materials, processes, etc.

The clocked elements are spaced apart one from another such that the variation of the propagation delay of a shift signal from one clocked element to the next is sufficiently small that it can be guaranteed that the timing requirements of the clocked elements can be met, given the clock frequency.

DETAILED DESCRIPTION OF THE PREFERRED EMBODIMENTS

Figure 6:
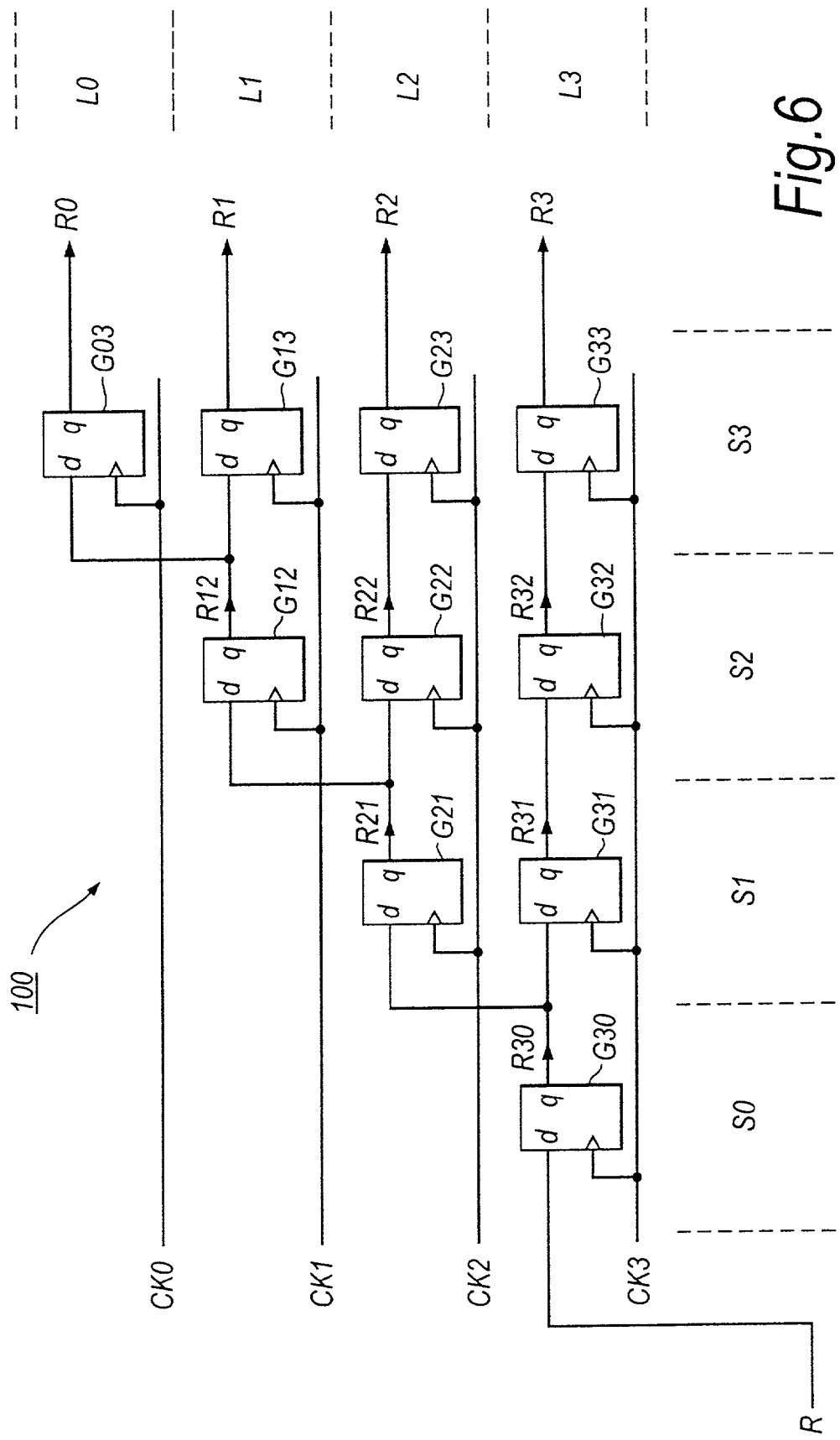
FIG. 6 is a block diagram showing a first example of signal distribution circuitry for use in an embodiment of the present invention.

FIG. 6 is a block diagram showing a first example of signal distribution circuitry 100 for use in an embodiment of the present invention. The signal distribution circuitry 100 can be used in a chip to distribute a digital signal (such as the reset signal R of FIG. 1) from a source node (such as the input pin $7_R$ of FIG. 1) to a plurality of destination nodes (such as the signal processing portions $5_0$ to $5_{n-1}$ of FIG. 1).

Figure 2A:
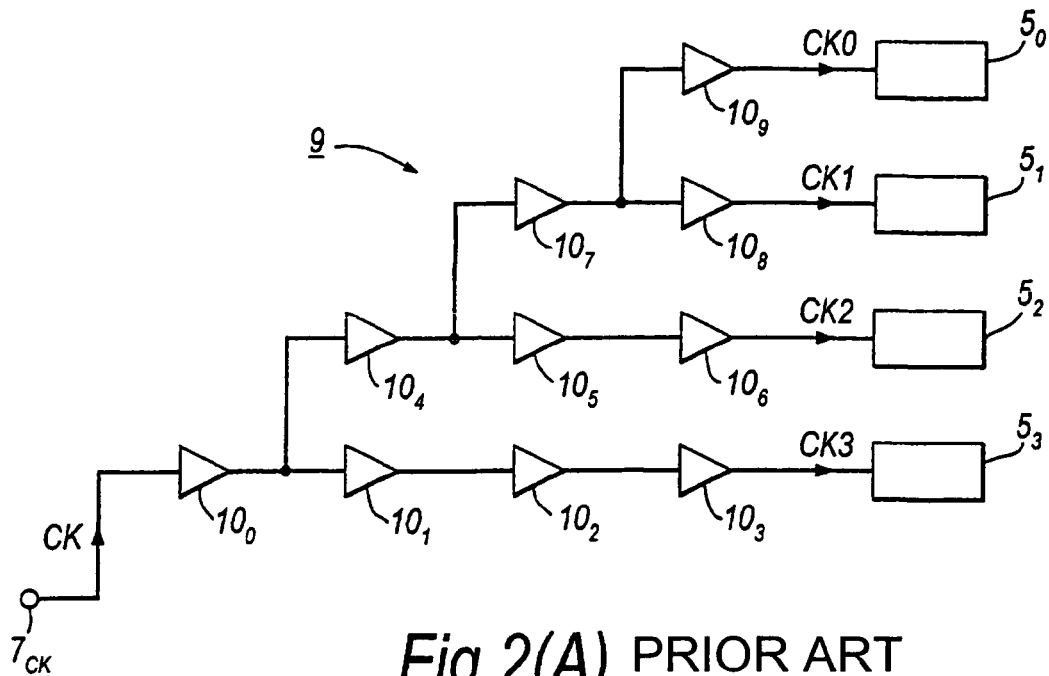
FIG. 2(A), also discussed hereinbefore, illustrates clock distribution circuitry for distributing a clock signal to different parts of a chip.
Figure 2B:
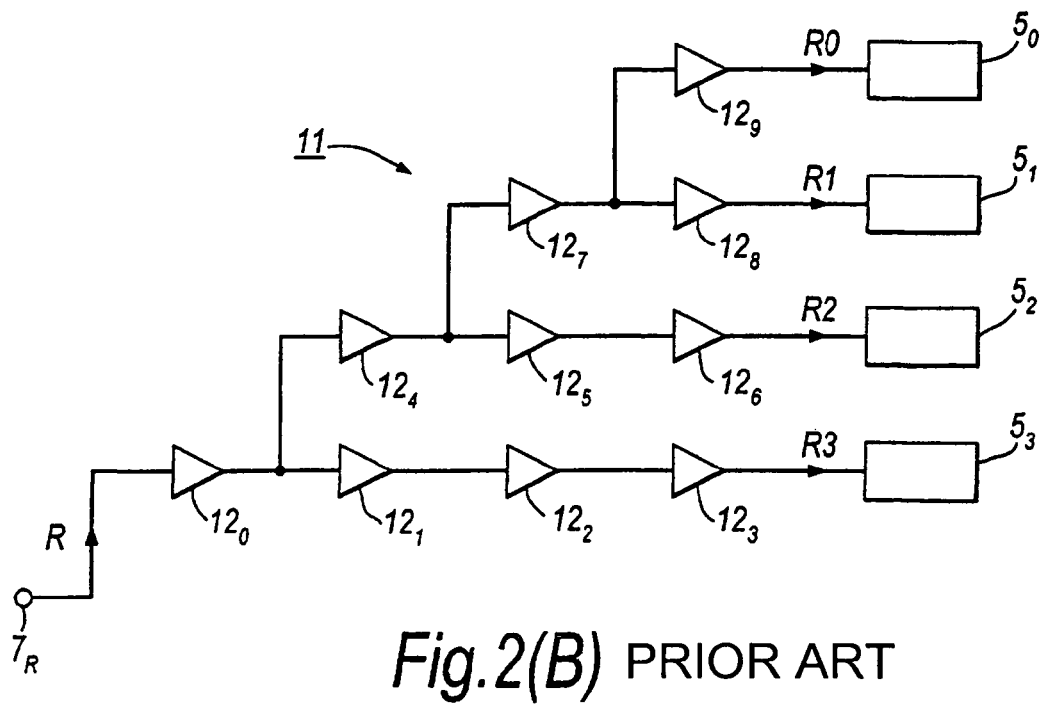
FIG. 2(B), also discussed hereinbefore, illustrates reset signal distribution circuitry for distributing a reset signal to different parts of a chip.

The FIG. 6 circuitry is therefore intended as a replacement of the reset signal distribution circuitry 11 described above with reference to FIG. 2(B). In FIG. 6, the reset signals R, R0, R1, R2 and R3 are intended to correspond to the similarly-named reset signals in FIG. 2(B). The clock signals CK0 to CK3 are also intended to correspond to the similarly-named distributed clock signals in FIG. 2(A), which are derived from the input clock signal CK. In this embodiment the clock signals CK0 to CK3 are produced using the clock distribution circuitry of FIG. 2(A).

The signal distribution circuitry 100 of FIG. 6 comprises ten positive-edge triggered registers (clocked elements) G03, G12, G13, G21–G23 and G30–G33 arranged in four stages S0 to S3 and along four lines L0 to L3. Registers G30 to G33 are arranged along line L3 in the four respective stages S0 to S3. Registers G21 to G23 are arranged along line L2 in stages S1 to S3 respectively. Registers G12 and G13 are arranged along line L1 in stages S2 and S3 respectively. Register G03 is arranged on line L0 in stage S3.

Each of the four registers G30 to G33 arranged along line L3 receives at its clock input a clock signal CK3. Each of the registers G21 to G23 arranged along line L2 is clocked by a clock signal CK2. Both of the registers G12 and G13 arranged along line L1 are clocked by a clock signal CK1. The register G03 arranged on line L0 is clocked by the clock signal CK0.

Figure 1:
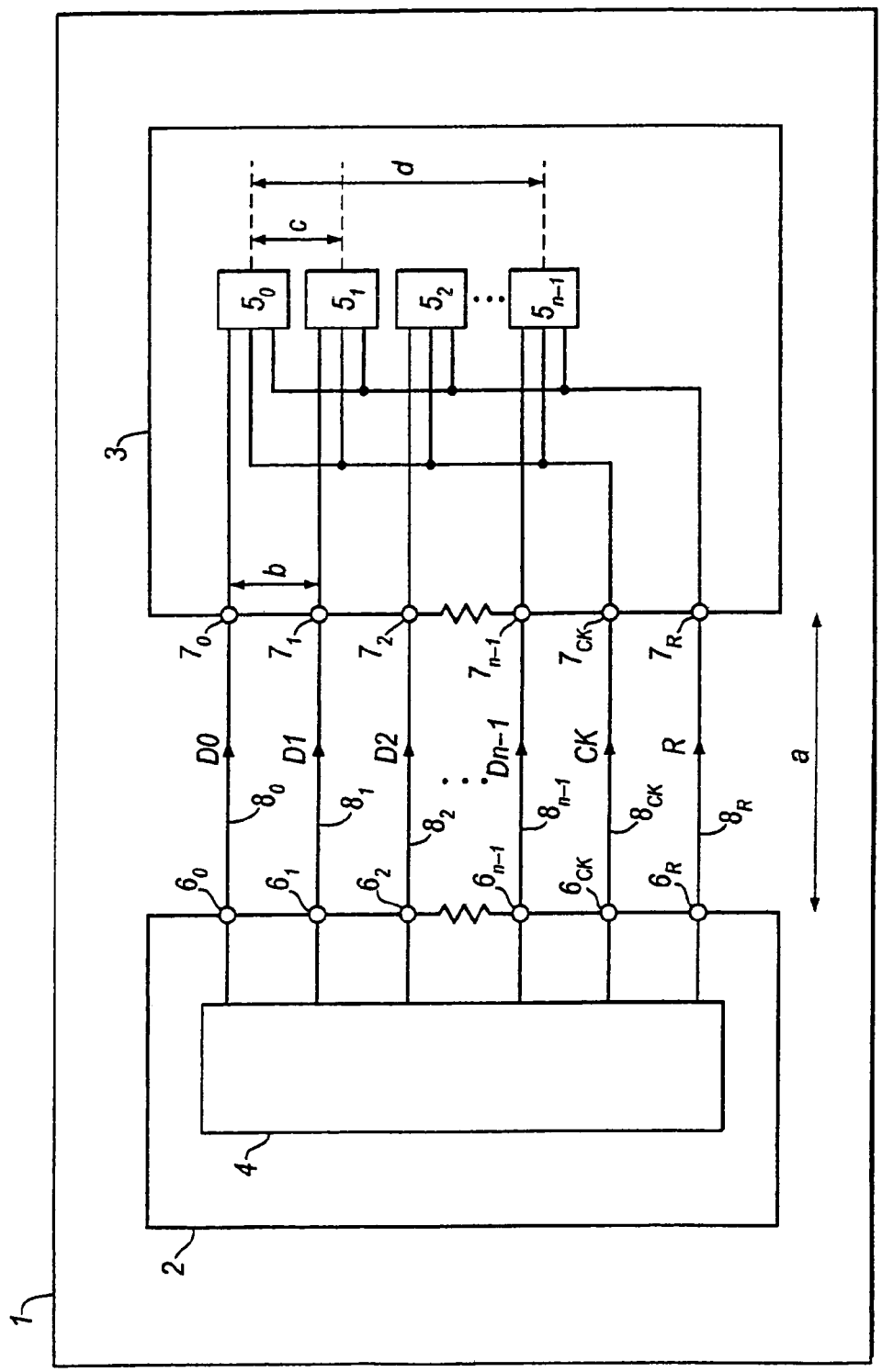
FIG. 1, discussed hereinbefore, is a block diagram illustrating a synchronous interface between two chips on a printed circuit board.

The lines L0 to L3 of registers are preferably spaced apart physically by a distance approximately the same as the spacing "c" between the signal processing circuitry portions 5 to which the signals are being distributed, which in the FIG. 1 example is itself approximately the same as the pin separation "b". A line of registers is therefore preferably arranged between its corresponding input pin and its corresponding signal processing circuitry portion 5, and is preferably clocked by the clock signal being distributed on a clock line physically closest to it.

The registers are arranged and connected in a tree-like formation as follows, with a single register G30 in stage S0, two registers G21 and G31 in stage S1, three registers G12, G22 and G32 in stage S2 and four registers G03, G13, G23 and G33 in stage S3. Each register has a data input d for receiving a reset signal from the preceding stage, and a data output q for outputting a reset signal to the subsequent stage. Register G30, at the head of the tree-like formation of registers, receives at its d input the reset signal (transmission signal) R, and outputs at its q output an intermediate reset signal (shift signal) R30. Registers G21 and G31 in stage S1 both receive at their respective d inputs the intermediate reset signal R30 from the preceding stage S0, and output at their respective q outputs intermediate reset signals R21 and R31. Registers G12 and G22 in stage S2 both receive at their respective d inputs the intermediate reset signal R21 from the preceding stage S1, while register G32 in stage S2 receives at its d input the intermediate reset signal R31 from the preceding stage S1. The three registers G12, G22 and G32 in stage S2 output at their respective q outputs intermediate reset signals R12, R22 and R32. Registers G03 and G13 in stage S3 both receive at their respective d inputs the intermediate reset signal R12 from the preceding stage S2, while registers G23 and G33 in stage S3 receive at their respective d inputs the intermediate reset signals R22 and R32 from the preceding stage S2. The four respective q outputs of registers G03, G13, G23 and G33 in the final stage S3 are the distributed reset signals R0 to R3 respectively.

Figure 7:
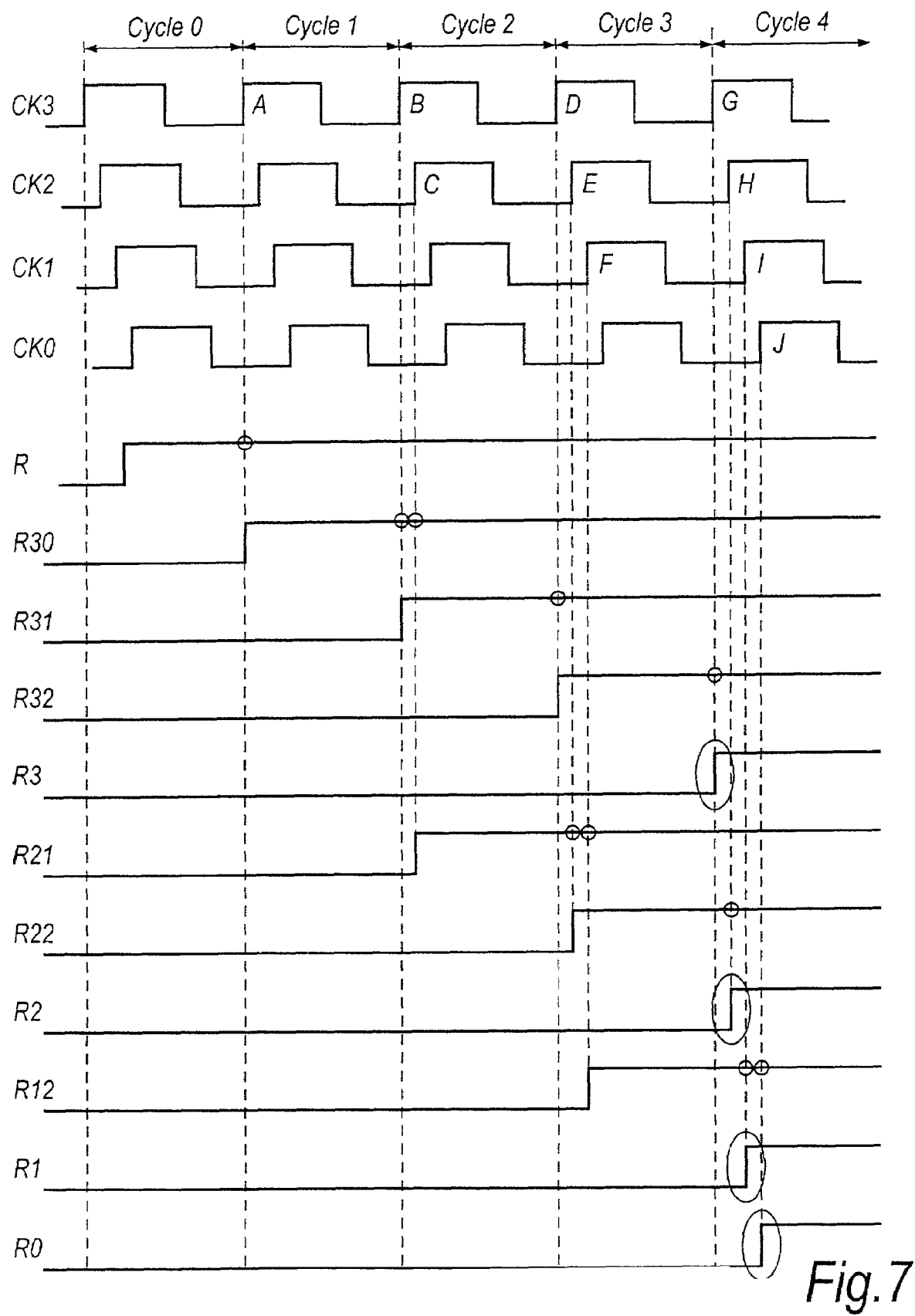
FIG. 7 is a timing diagram for use in illustrating the operation of the circuitry of FIG. 6.

Operation of the signal distribution circuitry 100 of FIG. 6 will now be described with reference to the timing chart of FIG. 7. As described above with reference to FIGS. 3(A) to 3(C), the four distributed clock signals CK0 to CK3 will inevitably exhibit a degree of timing jitter with respect to one another due to PVT variations along their respective distribution paths. FIG. 7 shows an example where the delay experienced by each of these four distributed clock signals varies uniformly and increasingly from CK3 to CK0. This is merely for simplicity of illustration, and in practice the jitter between these clock signals will not be uniform or predictable. Since, in this example, the register G30 at the head of the tree-like formation of registers shown in FIG. 6 receives the reset signal R and is clocked by the clock signal CK3, all timings in FIG. 7 are shown relative to clock signal CK3, which is divided into clock cycles 0 to 4. Neither the switch time of a register nor the propagation time of an intermediate reset signal from one register to another is taken into account for the purposes of this illustration but will be considered in more detail below.

In the example shown in FIG. 7, the received reset signal R becomes active during cycle 0 of clock signal CK3. It is assumed that the set-up time of register G30 is met during cycle 0, so that the intermediate reset signal R30 goes high at the rising edge A of clock signal CK3 which begins cycle 1. The high level of intermediate reset signal R30 is then clocked through the registers G31 and G21 in stage S1 at the subsequent rising edges B and C of clock signals CK3 and CK2 respectively at the start of cycle 2, causing the intermediate reset signals R31 and R21 to go high. Likewise the intermediate reset signals R32, R22 and R12 in stage S2 are caused to go high on the respective rising edges D, E and F of clocks CK3, CK2 and CK1 at the start of cycle 3, and the final distributed reset signals R3, R2, R1 and R0 are clocked high by respective rising edges G, H, I and J of clock signals CK3, CK2, CK1 and CK0 at the start of cycle 4. The times at which the distributed reset signals R0 to R3 go high are shown by rings around the rising edges of those signals in FIG. 7.

Therefore, provided that the set-up requirement of the first register G30 is met in cycle 0, each of the distributed reset signals R0 to R3 becomes active at the start of cycle 4, that is the fourth cycle after the input reset signal R became active. This delay of four cycles is due to the four stages S0 to S3 of registers.

Although the distributed reset signals R0 to R3 exhibit timing jitter with respect to one another as a result of the jitter in the distributed clock signals CK0 to CK3, the jitter of a particular distributed reset signal relative to its own associated clock is very small and is limited to such factors as the switch time of the final-stage register and metal loading delay in distributing the reset and clock signals the short distance to the signal processing circuitry portions concerned. Since a particular distributed clock signal is used to control both the final timing of the reset signal distributed to its associated signal processing circuitry portion and the timing of the signal processing circuitry portion itself, the distributed reset signal can be guaranteed to arrive within a predetermined clock cycle of the local distributed clock signal. For instance, distributed reset signal R3 can be guaranteed to go high a short time into clock cycle 4 of distributed clock signal CK3 (taking into account the switch time of register G33), even though this may actually be during clock cycle 3 of distributed clock signal CK0.

With reset signal distribution circuitry such as that of FIG. 6, the reset signal R is captured using one version of the clock (CK3 in the FIG. 6 example) and a clocked version of the reset signal is then passed along each line of registers, and from line to line, with each line of registers being clocked by a different version of the clock signal. As the variation in signal delay between lines and between registers along the same line is manageable the reset signal will eventually arrive at all destination points at a deterministic clock cycle (four cycles after the cycle in which the reset signal R becomes active in the FIG. 6 example). The timing requirements which must be met by the signal distribution circuitry to guarantee arrival of the distributed signals at their respective destinations during a predetermined clock cycle will now be described in more detail with reference to FIG. 8.

Figure 8:
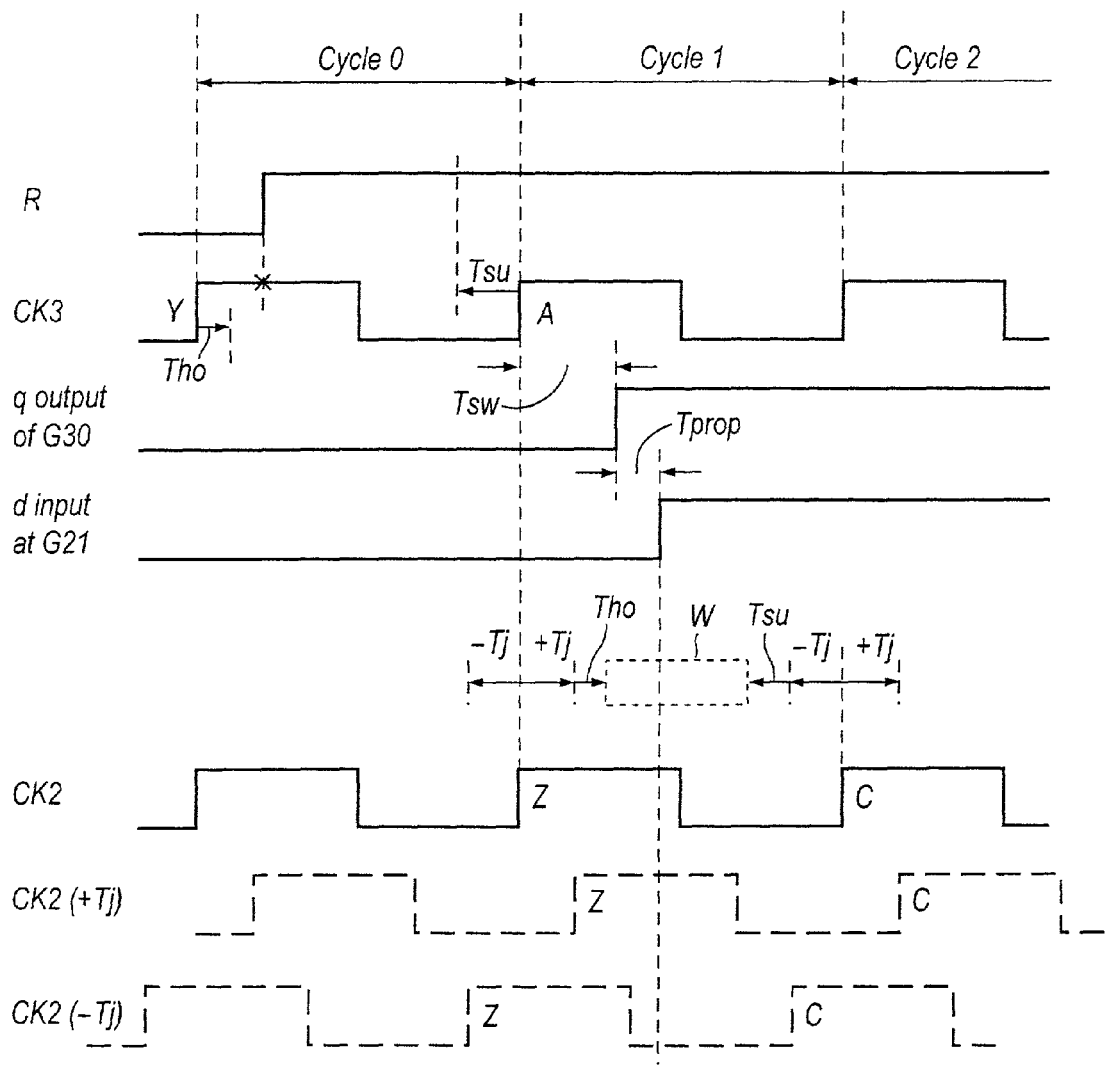
FIG. 8 is a timing diagram for use in illustrating the requirements for correct operation of an embodiment of the present invention.

FIG. 8 is a timing chart showing the timing of signals relating only to the operation of registers G30 and G21 of the FIG. 6 circuitry. If the received reset signal R becomes active during cycle 0 of clock signal CK3, for correct operation of registers G30 and G21 within the overall circuitry 100, it must firstly be guaranteed that the reset signal R is latched by register G30 on the rising edge A of clock signal CK3 which starts cycle 1, and it must secondly be guaranteed that the intermediate reset signal R30 is latched by register G21 on the rising edge C of clock signal CK2 at the start of cycle 2.

The first condition will be met if the reset signal R changes to the high level before a time Tsu before rising edge A of clock signal CK3, but after a time Tho after rising edge Y of clock signal CK3, where Tsu is the maximum set-up time of registers G30 and G21 and Tho is the maximum hold time of those registers. This can usually be easily arranged by use of suitable circuitry, for example circuitry which fixes the timing of the reset signal R relative to CK3 itself.

Once it has been arranged for the first condition to be met, then the q-output of register G30 will change to the high level after a delay Tsw, where Tsw is the switching time of that register. The capacitive and resistive loading of the interconnect (formed, for example, of metal) between registers G30 and G21 imposes a further propagation delay Tprop on the reset signal R30, so that the d-input of register G21 only becomes high after a total time of Tsw+Tprop after the rising edge A of clock CK3 at the start of cycle 1.

As described above, clock signal CK2, which is used to clock register G21, will exhibit a timing jitter with respect to clock CK3 of between ±Tj. If the d input of register G21 becomes high before a set-up time Tsu before the rising edge Z, the high level at the d input will actually be latched on rising edge Z of clock signal CK2 rather than on the rising edge C, with the result that the intermediate reset signal R21 output from register G21 will become high during cycle 1 rather than cycle 2. If the d input of register G21 becomes high between a set-up time Tsu before the rising edge Z and a hold time Tho after the rising edge Z, the intermediate reset signal R21 output from register G21 will be indeterminate. If the d input of register G21 becomes high after a set-up time Tsu before the rising edge C of clock signal CK2, the high level at the d input will not be latched by rising edge C of clock signal CK2 as is required for correct operation, with the result that the intermediate reset signal R21 will only become high at the start of cycle 3 rather than cycle 2. For the set-up requirement of register G21 to be met satisfactorily during cycle 1, the d input of register G21 must therefore become high during the time period depicted by the window labelled W in FIG. 8.

Figure 3A:
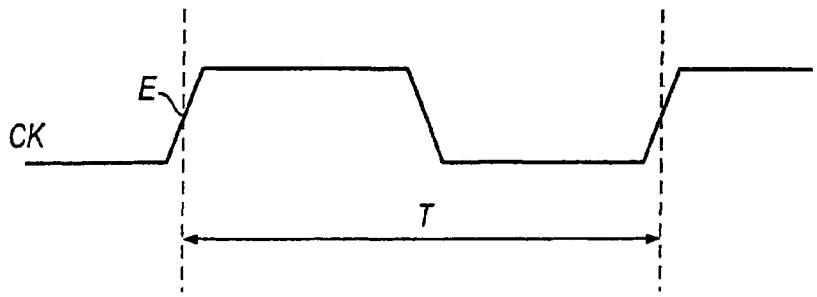
FIGS. 3(A), 3(B) and 3(C), also discussed hereinbefore, are timing diagrams illustrating the effect of process, voltage and temperature variations on the timing of a distributed clock signal.
Figure 3B:
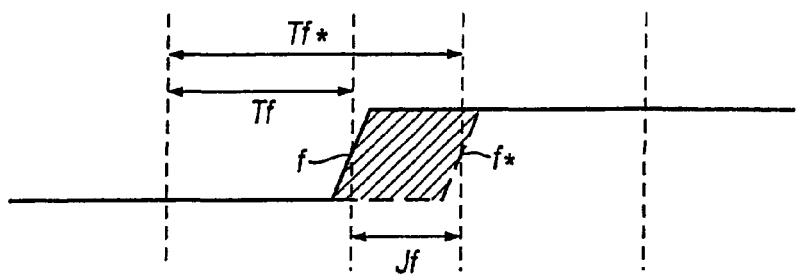
Figure 3C:
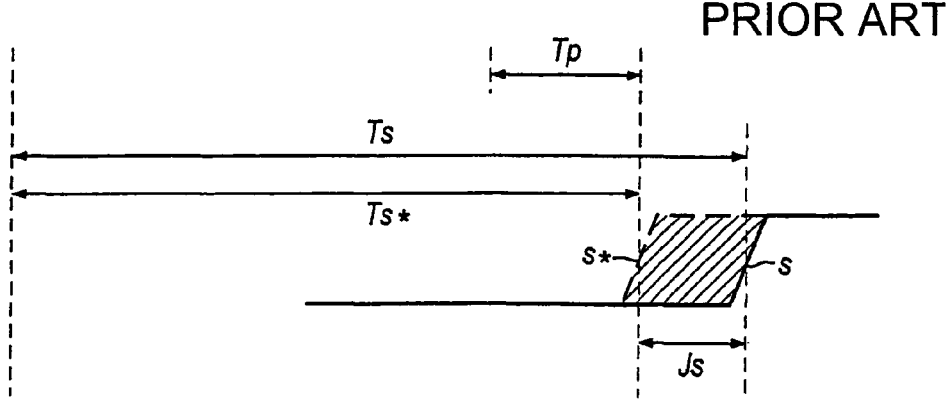
Figure 4A:
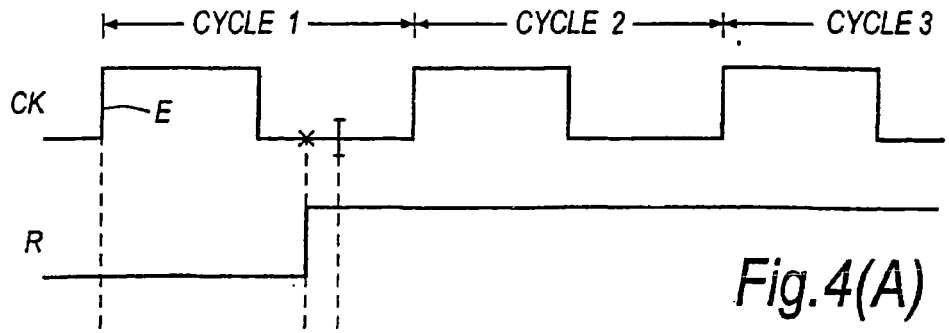
FIGS. 4(A), 4(B) and 4(C), also discussed hereinbefore, are timing diagrams for use in explaining the problem caused by process, voltage and temperature variations.
Figure 4B:
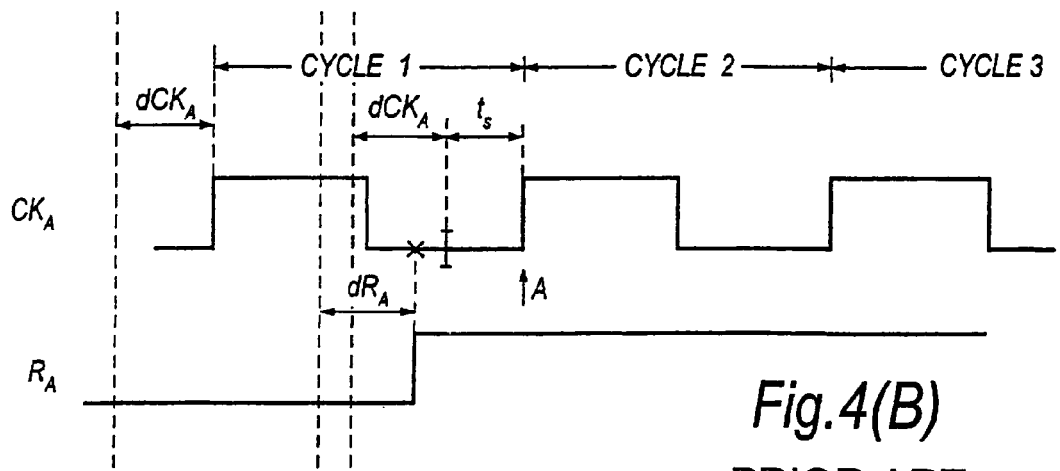
Figure 4C:
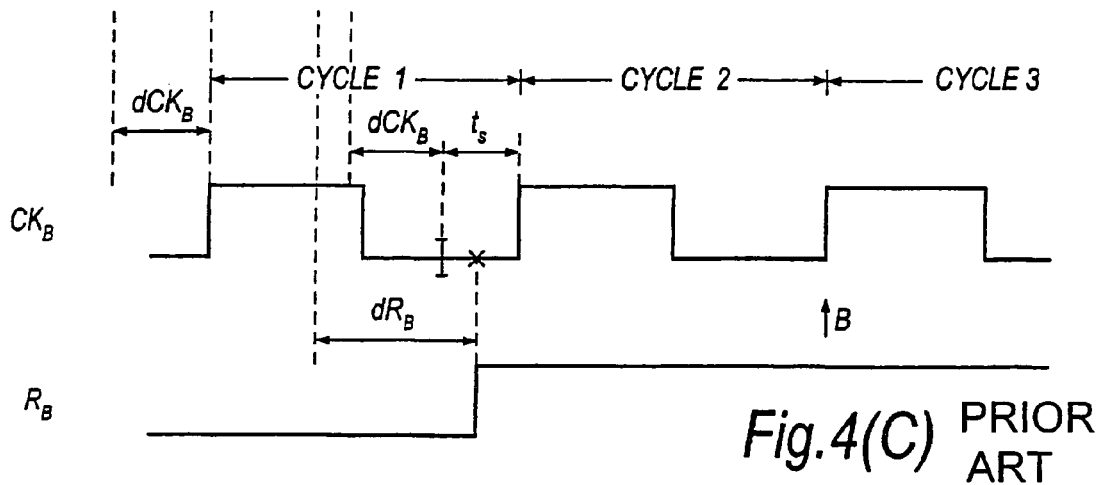
Figure 5A:
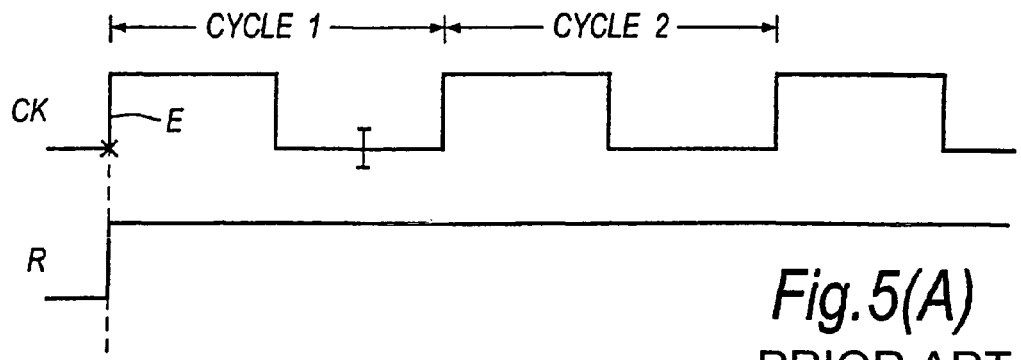
FIGS. 5(A) and 5(B), also discussed hereinbefore, are further timing diagrams for use in explaining the problem caused by process, voltage and temperature variations.
Figure 5B:
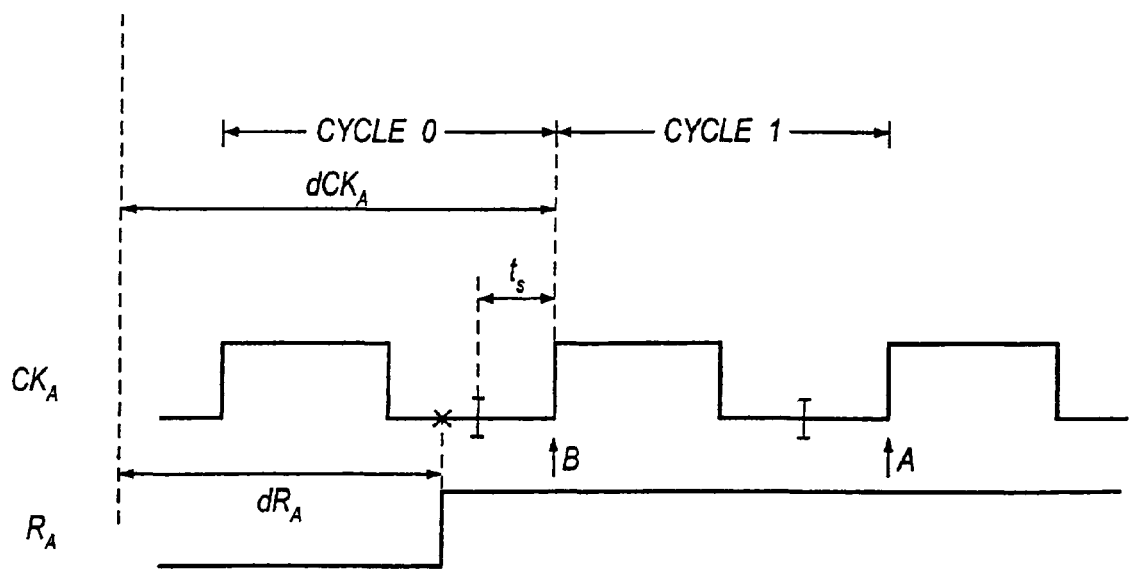

Consider the timing example given above with reference to FIGS. 3(A) to 3(C) with a clock frequency of 673 MHz and a clock cycle period of 1.48 ns. The timing jitter Tj between distributed clocks is expected to be at most 15% of the total clock distribution time, which itself varies according to PVT conditions. Under "maximum delay" PVT conditions the maximum clock distribution jitter Tj is approximately 275 ps. Assuming that the set-up time Tsu and hold time Tho of a register are of the order of 200 ps and 50 ps respectively, this means that the timing requirements of the circuitry are met even when the combined register switch time Tsw and intermediate reset signal propagation time Tprop are as high as about 1000 ps or as low as about 325 ps.

In a typical application, the switch time Tsw of a register may be of the order of 400 ps, and the propagation time Tprop of an intermediate reset signal over a distance equivalent to the separation between adjacent lines of registers (or equivalently the pin separation "b" in the FIG. 1 example) of approximately 0.5 mm might be of the order of 100 ps. Thus the combined time Tsw+Tprop of 500 ps is well within the tolerance allowed by the window W, since the variation across PVT conditions of Tsw+Tprop is likely to be quite small in relation to the clock signal jitter.

The separation between registers in adjacent stages in the direction of clock signal propagation should preferably be kept to the minimum possible in order to reduce the propagation time Tprop to a minimum, and is usually much smaller than the transverse separation between adjacent lines of registers. For example, while the separation between adjacent lines of registers may be of the order of 0.5 mm, the separation between registers in adjacent stages along the line of clock signal propagation can be of the order of 50 µm. It is not usually necessary for the channel spacing ("c" or "b" in FIG. 1) to be tightly matched.

Figure 9:
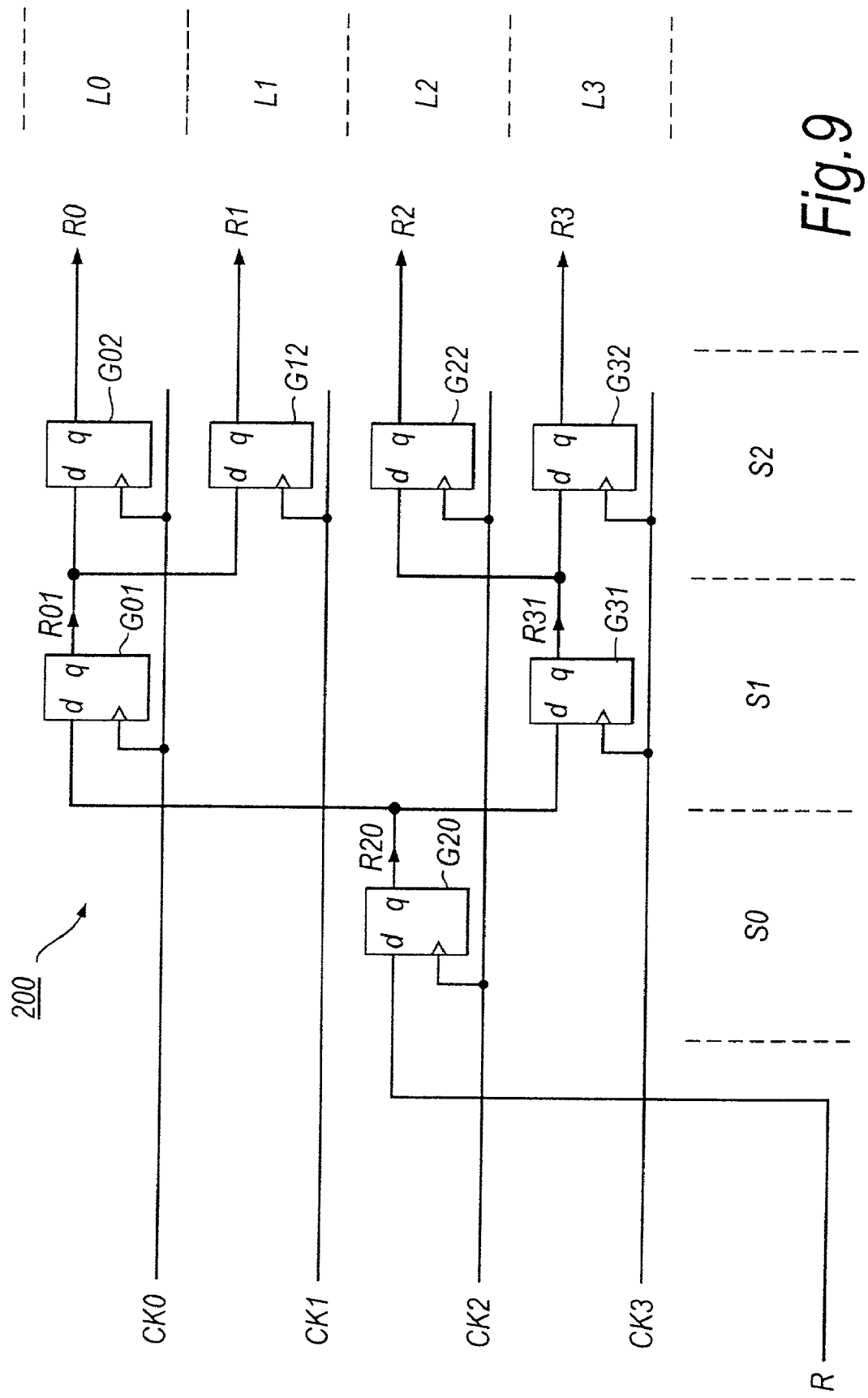
FIG. 9 is a block diagram showing a second example of signal distribution circuitry for use in an embodiment of the present invention.

FIG. 9 is a block diagram showing signal distribution circuitry 200 in a second embodiment of the present invention. The signal distribution circuitry 200 of FIG. 9 comprises seven positive-edge triggered registers G20, G01, G31, G02, G12, G22 and G32 arranged in three stages S0 to S2 and along four lines L0 to L3. Registers G31 and G32 are arranged along line L3 in respective stages S1 and S2. Registers G20 and G22 are arranged along line L2 in stages S0 and S2 respectively. Register G12 is arranged on line L1 in stage S2. Registers G01 and G02 are arranged along line L0 in stages S1 and S2 respectively.

As with the first embodiment described above with reference to FIG. 6, the lines L0 to L3 of registers are preferably separated by a distance approximately equal to the separation of the destination points of the distributed reset signals R0 to R3, which in the FIG. 1 example are the signal processing circuitry portions $5_0$ to $5_3$. Each line of registers has a corresponding clock line physically close to it, which carries a distributed clock signal used to clock that line of registers. Therefore registers G31 and G32 in the second example receive at their respective clock inputs the clock signal CK3 which is being distributed to the same destination as the reset signal R3, and which is therefore physically closest to those registers G31 and G32. Likewise, G20 and G22 receive at their respective clock inputs the distributed clock signal CK2. Register G12 receives at its clock input the distributed clock signal CK1. Registers G01 and G02 receive at their respective clock inputs the distributed clock signal CK0.

The registers are arranged and connected in a tree-like formation as follows, with a single register G20 in stage S0, two registers G01 and G31 in stage S1, and four registers G02, G12, G22 and G32 in stage S2. Register G20, at the head of the tree-like formation of registers, receives at its d input the reset signal R, and outputs at its q output and intermediate reset signal R20. Registers G01 and G31 in stage S1 both receive at their respective d inputs the intermediate reset signal R20 from the preceding stage S0, and output at their respective q outputs intermediate reset signals R01 and R31. Registers G02 and G12 in stage S2 both receive at their respective d inputs the intermediate reset signal R01 from the preceding stage S1, while registers G22 and G32 in stage S2 receive at their respective d inputs the intermediate reset signal R31 from the preceding stage S1. The four respective q outputs of registers G02, G12, G22 and G32 in the final stage S3 are the distributed reset signals R0 to R3 respectively.

Figure 10:
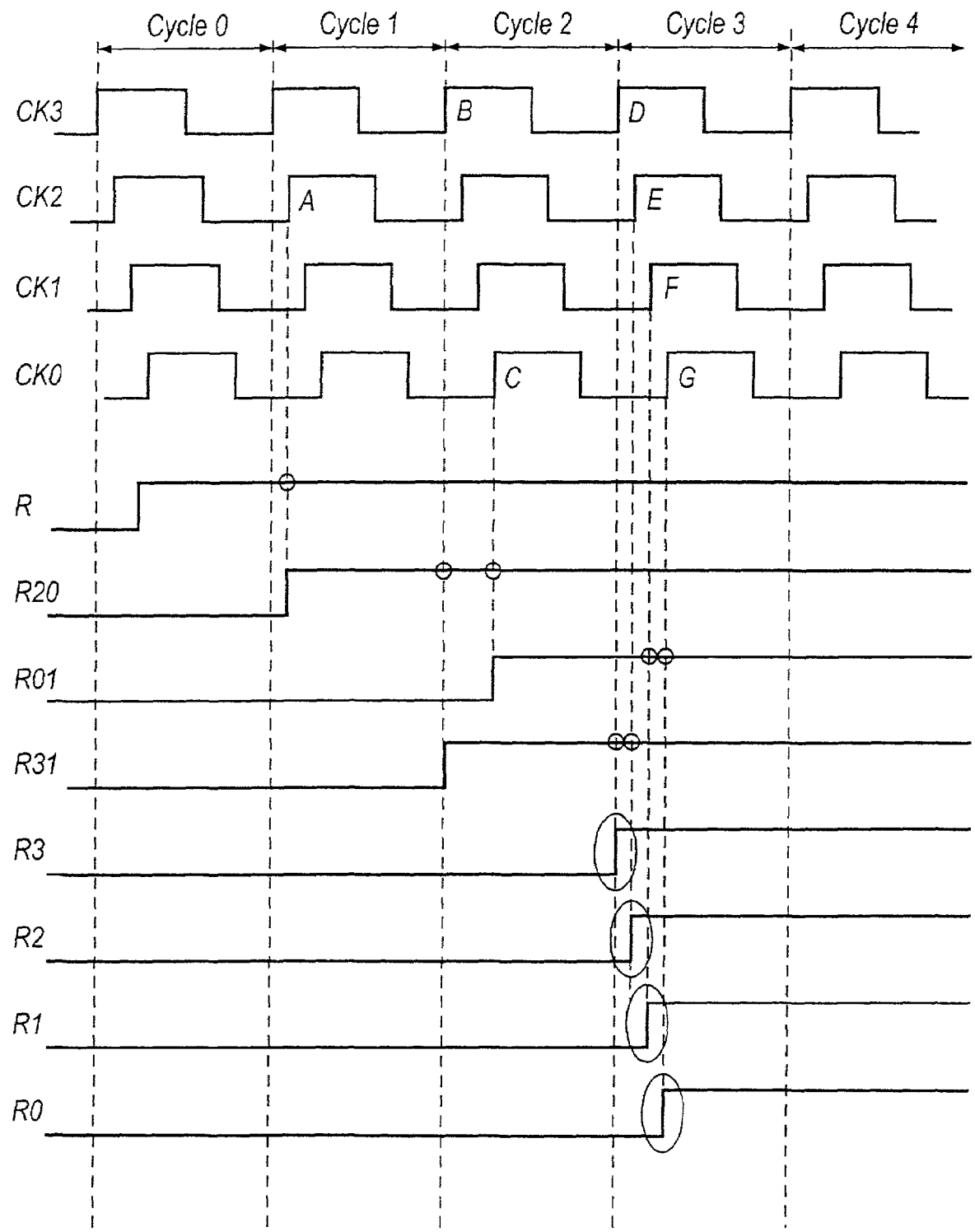
FIG. 10 is a timing diagram for use in illustrating the operation of the FIG. 9 circuitry.

Operation of the signal distribution circuitry 200 of FIG. 9 will now be described with reference to the timing chart of FIG. 10. The received reset signal R becomes active during cycle 0 (shown relative to corresponding distributed clock signal CK3). As described above with reference to FIG. 8, it is assumed that the set-up time of register G20 is met during cycle 0, so that the intermediate reset signal R20 goes high on the rising edge A of clock signal CK2 which begins cycle 1. The high level of intermediate reset signal R20 is then clocked through the registers G31 and G01 in stage S1 at the subsequent rising edges B and C of clock signals CK3 and CK0 respectively at the start of cycle 2, causing the intermediate reset signals R31 and R01 to go high. The final distributed reset signals R3, R2, R1 and R0 are clocked high by respective rising edges D, E, F and G of clock signals CK3, CK2, CK1 and CK0 respectively at the start of cycle 3. The times at which the distributed reset signals R0 to R3 go high are shown by rings around the rising edges of those signals in FIG. 10.

Therefore, provided that the set-up requirement of the first register G20 is met in cycle 0, each of the distributed reset signals R0 to R3 becomes active at the start of cycle 3, that is the third cycle after the input reset signal R became active. This delay of three cycles is due to the three stages S0 to S2 of registers, which is a shorter delay than the delay of four cycles with the signal distribution of circuitry 100 of the first embodiment described above with reference to FIGS. 6 and 7.

In the signal distribution circuitry 100 of the first embodiment, an intermediate reset signal was only ever passed from one line of registers to the next line of registers, so that the transverse distance travelled by such an intermediate reset signal was at most approximately equal to the line separation. In the second embodiment described above with reference to FIG. 9, the intermediate reset signal R20 is passed from line L2 to line L0 when being passed from stage S0 to S1, which is a jump equal to twice the separation between adjacent lines of registers. Referring to the timing chart of FIG. 8, such a jump across two lines will not upset the overall timing requirements of the circuitry described with reference to FIG. 8 provided that the propagation time Tprop of the intermediate reset signal R20 from register G20 to G01 is such that it will arrive at register G01 within the window W shown in FIG. 8.

With the example described above with reference to FIG. 8 where the frequency of the clock signals is 673 MHz (clock cycle period is 1.48 ns), this might mean that the maximum jump of such an intermediate reset signal should preferably be restricted to two lines of registers where the line separation is 0.5 mm as in FIG. 1. However, in other applications, for example where the spacing between lines of registers is smaller or where the drive strength of a register is greater, the jump need not be restricted to two lines of registers.

Figure 11:
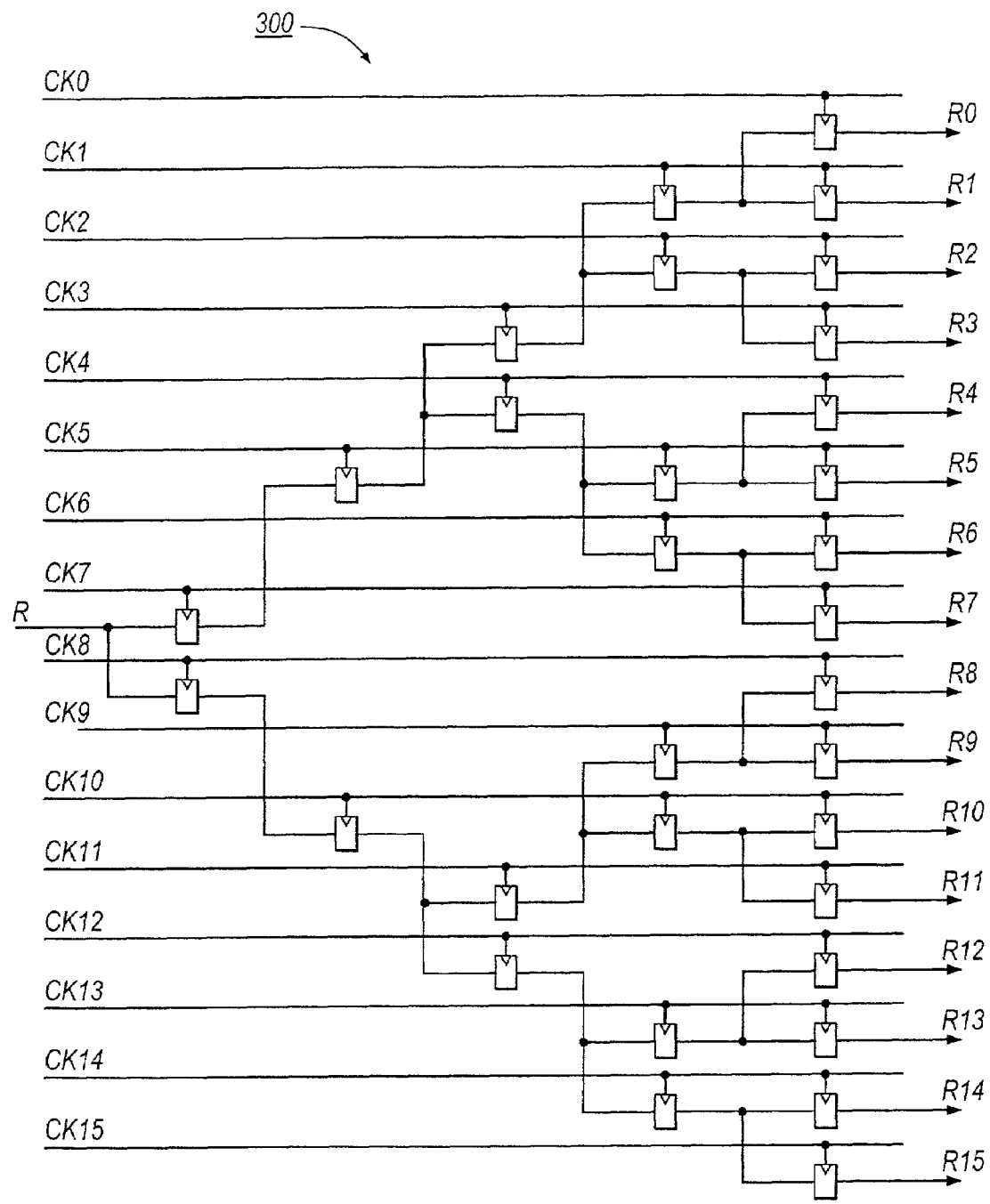
FIG. 11 is a block diagram showing a third example of signal distribution circuitry for use in an embodiment of the present invention.

FIG. 11 is a block diagram showing signal distribution circuitry 300 according to a third embodiment of the present invention. The signal distribution circuitry 300 of FIG. 11 is for use in a situation where a reset signal R is required to be distributed to 16 different destination points within the circuitry, for example 16 signal processing circuitry portions $5_0$ to $5_{15}$ in FIG. 1. Similar considerations apply to the FIG. 11 circuitry as apply to the circuitry described above with reference to FIGS. 6 to 10, so further detailed discussion of the operation of the FIG. 11 circuitry will not be described herein. The maximum transverse span of lines of registers crossed by an intermediate reset signal in the FIG. 11 circuitry is two, and the maximum fan-out from one stage of registers to the next is also two.

Although embodiments of the invention have been described above in relation to the synchronous interface application described previously with reference to FIG. 1, it will be appreciated that an embodiment of the present invention is applicable in other situations as well. For example, were an asynchronous interface to be used instead of a synchronous interface, n individual clocks CK0 to CKn−1 could be recovered from the incoming data streams D0 to Dn−1 respectively, and those recovered clock signals CK0 to CKn−1 would themselves be used directly to clock the appropriate registers in the signal distribution circuitry as described above.

An embodiment of the present invention is also not limited to the situation described in FIG. 1 where a single clock is distributed to each of the plurality of signal processing circuitry portions 5, and would also be applicable in the case where there are n separate clock input pins, each for receiving a clock signal for distribution to a corresponding one of the signal processing circuitry portions 5. In this case, the n individual clock signals would be used directly to clock the appropriate registers in the signal distribution circuitry described above. It would of course be necessary to ensure that the relative timing jitter between the individual clock signals satisfies the overall timing requirements described above with reference to FIG. 8.

Although the above-mentioned embodiments have been described in the context of a synchronous interface between two chips where the separation between pins of the chip impose certain limitations on circuitry layout, it will be appreciated that an embodiment of the present invention is also applicable in other circumstances, for example, where the clock and/or reset signals are generated on the same chip and where the source of the reset signal is separated from the destination node by a relatively large distance.

Embodiments of the present invention are of course not limited to the transmission of a reset signal as described above, but can also be applied to the transmission of any other type of digital signal.

In the embodiments described above with reference to FIGS. 6, 9 and 11, a plurality of registers was used to distribute a reset signal from a single source point to a plurality of destination points. Each example used a tree-like formation of registers, with the number of registers in a stage increasing progressively from the first to the last stage. With such a configuration, although there are a plurality of different distribution paths between the source point and the destination points, several of the registers are shared between such distribution paths. For example, register G30 of the circuitry of FIG. 6 is at the root end of a tree-like formation branching into four nodes, and is therefore shared between all four distribution paths. This is also the case for register G20 in the circuitry of FIG. 9, while the register G01 of FIG. 9 is shared between two distribution paths.

Figure 12:
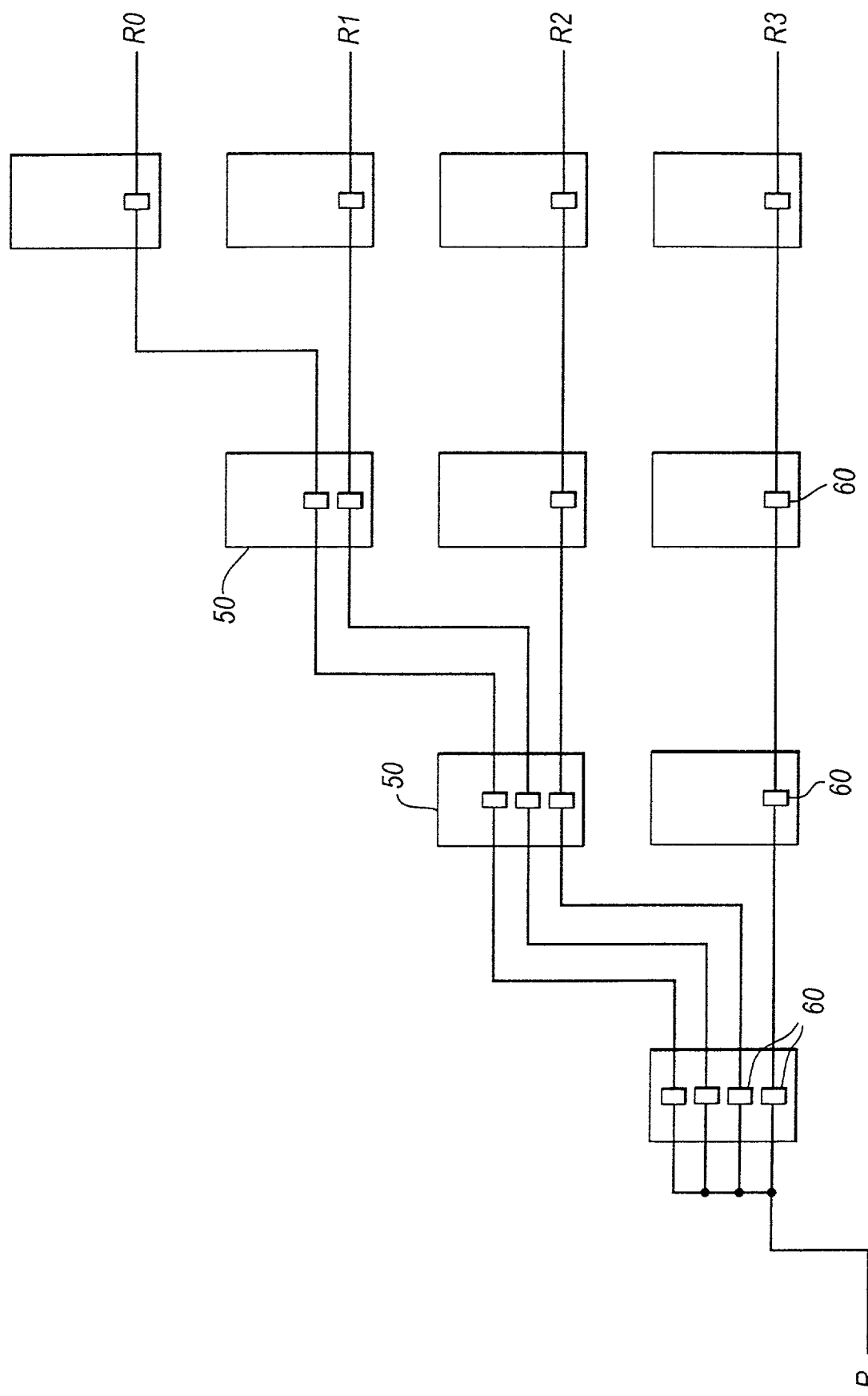
FIG. 12 shows an alternative arrangement to that of FIG. 6 having a plurality of independent distribution paths.

It will be appreciated that it is not essential to share registers between distribution paths in this way, and FIG. 12 shows an alternative arrangement to the distribution circuitry of FIG. 6 in which four entirely separate distribution paths are provided to distribute the reset signal R to the four respective destination points.

The FIG. 12 arrangement comprises 10 nodes 50 which are placed in positions which correspond to the positions of the registers of FIG. 6. However, where a particular register in the FIG. 6 configuration was shared between distribution paths, each corresponding node of the FIG. 12 configuration has a separate register 60 for each distribution path passing through that node. In this way, the four distribution paths in the FIG. 12 configuration are entirely independent, the distribution circuitry essentially consisting of four separate distribution paths of clocked registers. Each distribution path of registers must independently satisfy the timing requirements discussed above with reference to FIG. 8.

It will also be appreciated that embodiments of the present invention are not limited to the distribution of a digital signal from a single source node to a plurality of destination nodes, but are also applicable to the distribution of a signal from a single source node to a single destination node.

Figure 13A:
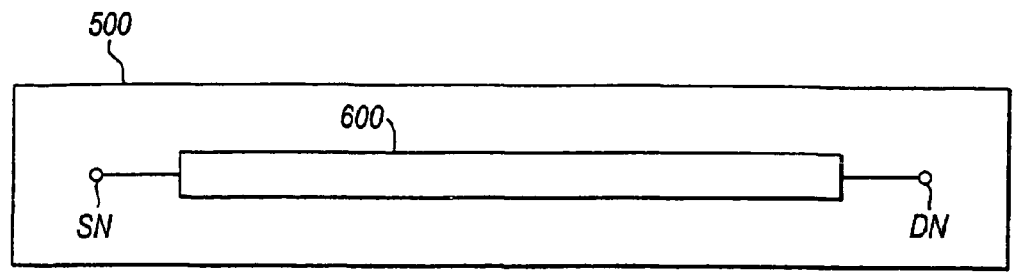
FIG. 13(A) is a block diagram of a conventional integrated circuit device.

FIG. 13(A) shows schematically a conventional semiconductor integrated circuit device 500 having distribution circuitry 600 connecting a source node SN with a destination node DN. The distribution circuitry 600 is designed such that the propagation time of a transmission signal from the source node SN to the destination node DN of the device 500 is minimised as far as possible, for example by use of active elements which operate as fast as the fabrication technology (CMOS, TTL etc.) and circuit dimensions allow, and/or the shortest and most direct wiring between nodes. The distribution circuitry 600 may, for example, comprise a series of buffers connected by metal tracking, with the number, size and separation of the buffers being chosen so as to minimise the overall propagation time, taking into account the switch time of the buffers, the loading of the metal tracking and of the buffers themselves, and strength of the buffers to drive a signal along the metal tracking. Alternatively the distribution circuitry 600 may consist exclusively of metal tracking.

Figure 13B:
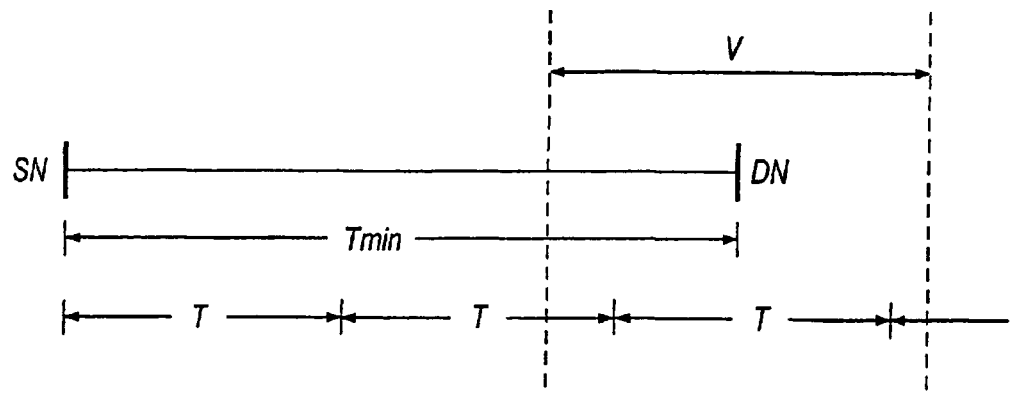
FIG. 13(B) is an illustrative diagram for use in explaining timing considerations in the device of FIG. 13(A)

The propagation time Tmin of a transmission signal distributed from the source node SN to the destination node DN in the device 500 is illustrated in FIG. 13(B), and is referred to as the minimum propagation time of the device. The variation V in this minimum propagation time Tmin is also illustrated in FIG. 13(B) along with a clock period T at an intended clock frequency of the device 500. The variation V may be due to, for example, PVT variation (as explained above).

The separation of the source node SN and the destination node DN in the FIG. 13(A) device is such that the variation V in the minimum propagation time Tmin of the transmission signal from the source node SN to the destination node DN is sufficiently large, relative to the clock period T, to cause variation in a clock cycle in which the transmission signal reaches the destination node. V could be less than T (e.g. only 10% of T) and still cause clock cycle variation, depending on the point in the clock cycle at which the transmission signal be sent from the source node.

Figure 14A:
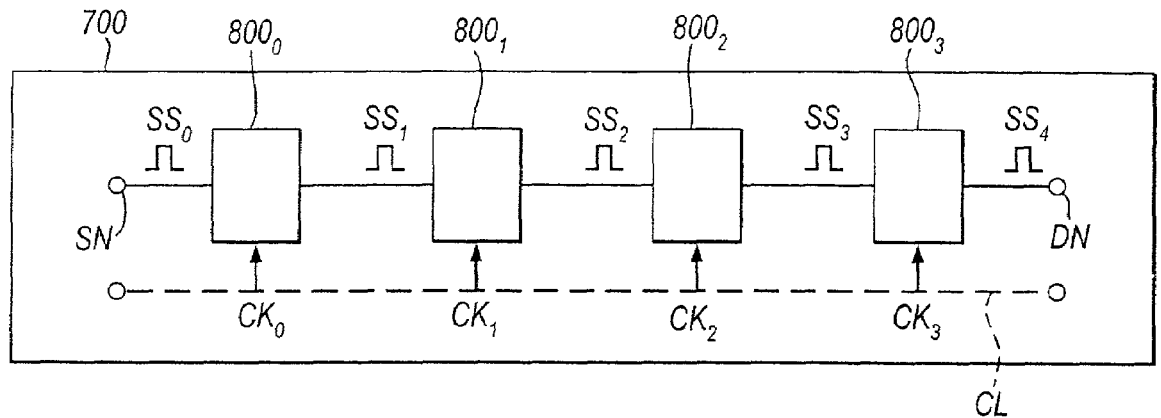
FIG. 14(A) is a block diagram showing an embodiment of the present invention having a single distribution path.

FIG. 14(A) shows parts of a semiconductor integrated circuit device 700 embodying the present invention. The fabrication technology (CMOS, TTL, etc.), fabrication scale (0.35 µm etc.) and dimensions of the device 700 are assumed to be the same as the integrated circuit device 500 of FIG. 13(A), and the separation of a source node SN and a destination node DN of FIG. 14(A) are assumed to be the same as in the FIG. 13(A) device.

The device 700 comprises a plurality of clocked elements $800_0$ to $800_3$ connected in series between a source node SN and a destination node DN which are clocked by respective clock signals $CK_0$ to $CK_3$. The clock signals $CK_0$ to $CK_3$ may be obtained from a common clock line CL as represented by the dotted line in FIG. 14(A) or from distribution circuitry such as that shown in FIG. 2(A). The clocked elements cause a shift signal SS, representing the transmission signal present at the source node SN in a first clock cycle, to be shifted from the source node SN to the destination node through the series of clocked elements. The transmission signal present at the source node SN in the first clock cycle is shifted through clocked element $800_0$ by clock signal $CK_0$ to produce the shift signal $SS_1$ in the second clock cycle. The shift signal $SS_1$ output from the clocked element $800_0$ is then shifted through clocked element $800_1$ in the third clock cycle by clock signal $CK_1$. This continues through clocked elements $800_2$ and $800_3$ such that a shift signal $SS_4$ output from the final clocked element $800_3$ in the series arrives at the destination node DN a fixed number of clock cycles (four clock cycles in this case) after the first clock cycle.

Figure 14B:
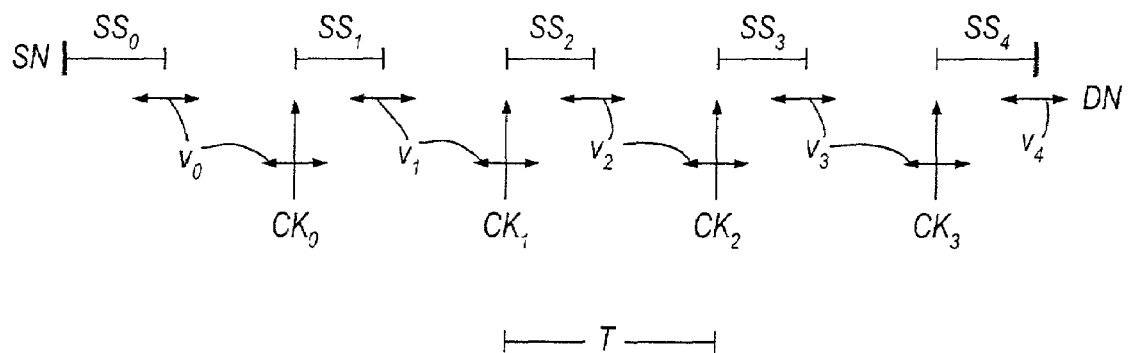
FIG. 14(B) is an illustrative diagram for use in explaining timing considerations in the device of FIG. 14(A).

The timing of these shift signals propagating through the series of clocked elements is illustrated in FIG. 14(B). A particular clock signal $CK_i$ causes the shift signal $SS_i$ present at the input of the clocked element $800_i$ to be shifted through the clocked element $800_i$ to appear as shift signal $SS_{i+1}$ at the output of the clocked element $800_i$. The shift signal $SS_{i+1}$ then propagates to the subsequent clocked element in the series.

Due to PVT variations, for example, there is a small uncertainty associated with the arrival time of a shift signal $SS_i$ at the subsequent clocked element $800_i$. There may also be an uncertainty associated with the timing of the clock signal $CK_i$ at clocked element $800_i$. The combination of these uncertainties results in an effective variation $v_i$ in the propagation time of a shift signal $SS_i$ from one clocked element $800_i$ to the next clocked element $800_{i+1}$. However, it can be arranged, as previously described above with reference to FIG. 8, that the variation $v_i$ in a propagation time of a shift signal $SS_i$ from one clocked element $800_i$ to the next clocked element $800_i$ is sufficiently small, relative to the clock period T, that a clock cycle in which that shift signal $SS_i$ reaches the next clocked element $800_i$ does not vary, such that the shift signal $SS_4$ always reaches the destination node DN a fixed number of clock cycles after the first clock cycle. The shift signal is shifted from the source node SN to the destination node DN through the series of clock elements one clocked element per predetermined number of clock cycles, where the predetermined number may be greater than one.

Whilst it is preferable to reduce the spacing between adjacent clocked elements 800 of the series of clocked elements in order to reduce the variation $v_i$ in the propagation time of a shift signal $SS_i$ from one clocked element $800_i$ to the next clocked element $800_{i+1}$, it is also desirable from a manufacturing and cost point of view to have as few clocked elements as possible in the series. In addition, since at least one clock cycle delay is introduced by each clocked element, it may for this reason also be desirable to keep the number of clocked elements in the series to a minimum. This inevitably leads to a trade-off between reducing the variation "v" and minimising the number of clocked elements in the series. It is also desirable to arrange for the clocked elements $800_i$ to be approximately evenly spaced between the source node SN and the destination node DN so that the largest distance that a single shift signal SS is required to propagate is minimized for a particular number of clocked elements.

In the embodiments described previously with reference to FIGS. 6, 9, 11 and 12, the signals propagating between registers were termed "intermediate reset signals". These are equivalent to the "shift signals" of the FIG. 14(A) embodiment. The shift signal $SS_4$ which is received at the destination node DN of FIG. 14(A) is equivalent to one of the distributed reset signals R0 to Rn-1 of the previously-described embodiments. The transmission signal $SS_0$ present at the source node SN of FIG. 14(A) in a first clock cycle is equivalent to the received reset signal R of the previously-described embodiments.

It will be appreciated that the shift signal which is shifted through the series of clocked elements in FIG. 14(A) need only be representative of the transmission signal to be transmitted from the source node SN to the destination node DN, and need not be an exact or even a close replica of the transmission signal. The clocked elements may perform an inverting or combinatorial logic function and/or a signal shaping function. For example in the case where the transmission signal is a reset signal such as that described with reference to FIGS. 6 to 12 above, the clocked elements in the FIG. 14(A) device could use a shift signal in the form of a pulse and the clocked elements would be suitable for shifting such a pulse from one clocked element to the next. A shift signal also need not be the same shape or form as another such shift signal at a different stage in the series of clocked elements.

What is claimed is:

1. A semiconductor integrated circuit device in which variation in a minimum propagation time of a transmission signal from a source node to a destination node is sufficiently large, relative to a clock period at an intended clock frequency of the device, to cause variation in a clock cycle in which the transmission signal reaches the destination node, the device comprising:
a plurality of clocked elements connected in series between the source and destination nodes for causing a shift signal, representing said transmission signal present at said source node in a first clock cycle, to be shifted from said source node to said destination node through said series of clocked elements one clocked element per predetermined number of clock cycles, said series of clocked elements being connected and arranged such that variation in a propagation time of said shift signal from each clocked element to the next clocked element is sufficiently small, relative to said clock period, that a clock cycle in which the shift signal reaches the next clocked element does not vary, whereby said shift signal always reaches said destination node a fixed number of clock cycles after said first clock cycle.

2. The semiconductor integrated circuit device as claimed in claim 1, further comprising a clock line for carrying a clock signal to said destination node, and wherein a circuit arranged at said destination node is clocked by a clock signal received from said clock line and is operable in response to said shift signal reaching said destination node to carry out a preselected operation.

3. The semiconductor integrated circuit device as claimed in claim 2, wherein at least a final clocked element of said clocked elements is clocked by a clock signal received from said clock line.

4. The semiconductor integrated circuit device as claimed in claim 2, wherein each clocked element is clocked by a clock signal received from said clock line.

5. A semiconductor integrated circuit device as claimed in claim 2, wherein said transmission signal is a reset signal and said preselected operation is a reset operation.

6. The semiconductor integrated circuit device as claimed in claim 1, wherein said clocked elements are approximately evenly spaced between said source node and said destination node.

7. The semiconductor integrated circuit device as claimed in claim 1, further comprising a plurality of clock lines each carrying a corresponding clock signal, and wherein each clocked element is clocked by a clock signal received from that one of said plurality of clock lines which is physically closest to that clocked element.

8. The semiconductor integrated circuit device as claimed in claim 7, wherein said plurality of clock lines originate from a single clock source point on the device.

9. The semiconductor integrated circuit device as claimed in claim 2, wherein the clock line comprises buffers along its length.

10. The semiconductor integrated circuit device as claimed in claim 1, having a plurality of such destination nodes and wherein such a series of clocked elements is connected between the source node and each of said plurality of destination nodes so that a shift signal, representing said transmission signal present at said source node in said first clock cycle, always reaches each destination node a fixed number of clock cycles after said first clock cycle.

11. The semiconductor integrated circuit device as claimed in claim 10, wherein the fixed number of clock cycles is the same for all the destination nodes.

12. The semiconductor integrated circuit device as claimed in claim 10, further comprising a plurality of clock lines each carrying a corresponding clock signal, wherein each clocked element is clocked by a clock signal received from that one of said plurality of clock lines which is physically closest to that clocked element and each of said plurality of clock lines carries a clock signal to a different one of said plurality of destination nodes.

13. The semiconductor integrated circuit device as claimed in claim 10, further comprising a plurality of clock lines each carrying a corresponding clock signal, wherein each clocked element is clocked by a clock signal received from that one of said plurality of clock lines which is physically closest to that clocked element, said plurality of clock lines extend generally in parallel with one another in a first direction, and the destination nodes are spaced apart one from the next in a second direction orthogonal to said first direction.

14. The semiconductor integrated circuit device as claimed in claim 13, wherein a spacing in said second direction between one destination node and the next destination node is at least an order of magnitude greater than a spacing in said first direction between successive clock elements of said series.

15. The semiconductor integrated circuit device as claimed in claim 10, wherein at least one clocked element is shared in common between two different series of clocked elements, the shift signal from the or each shared clocked element being passed on to subsequent clocked elements in two or more series.

16. The semiconductor integrated circuit device as claimed in claim 15, wherein the clocked elements are arranged physically in a succession of stages between said source node and said plurality of destination nodes, and at least one stage has fewer clocked elements than an adjacent stage further physically from said source node.

17. The semiconductor integrated circuit device as claimed in claim 1, wherein said predetermined number of clock cycles is one.

18. The semiconductor integrated circuit device as claimed in claim 1, wherein each clocked element comprises a register.

19. A method of propagating a transmission signal from a source node to a destination node in a semiconductor integrated circuit device in which variation in a minimum propagation time of said transmission signal from said source node to said destination node is sufficiently large, relative to a clock period at an intended clock frequency of the device, to cause variation in a clock cycle in which the transmission signal reaches the destination node, the method comprising:
 (a) arranging a plurality of clocked elements in series between the source and destination nodes; and
 (b) causing a shift signal, representing said transmission signal present at said source node in a first clock cycle, to be shifted from said source node to said destination node through said series of clocked elements one clocked element per predetermined number of clock cycles;
 wherein in step (a) the clocked elements are arranged such that variation in a propagation time of said shift signal from each clocked element to the next clocked element is sufficiently small, relative to said clock period, that a clock cycle in which the shift signal acts as a reset signal and reaches the next clocked element does not vary,
 whereby said shift signal always reaches said destination node a fixed number of clock cycles after said first clock cycle.

20. A semiconductor integrated circuit device in which variation in a minimum propagation time of a transmission signal from a source node to a destination node is sufficiently large, relative to a clock period at an intended clock frequency of the device, to cause variation in a clock cycle in which the transmission signal reaches the destination node, the device comprising:
 a plurality of clocked elements connected in series between the source and destination nodes for causing a shift signal, representing said transmission signal present at said source node in a first clock cycle, to be shifted from said source node to said destination node through said series of clocked elements one clocked element per predetermined number of clock cycles, said series of clocked elements being connected and arranged such that variation in a propagation time established in a preselected reset operation of said shift signal from each clocked element to the next clocked element is sufficiently small, relative to said clock period, that a clock cycle in which the shift signal reaches the next clocked element does not vary, whereby said shift signal always reaches said destination node a fixed number of clock cycles after said first clock cycle.

21. A method of propagating a transmission signal from a source node to a destination node in a semiconductor integrated circuit device in which variation in a minimum propagation time of the transmission signal from the source node to the destination node is sufficiently large, relative to a clock period at an intended clock frequency of the device, to cause variation in a clock cycle in which the transmission signal reaches the destination node, said method comprising:
 arranging a plurality of clocked elements in series between the source and destination nodes;
 establishing, for a preselected reset operation, the minimum propagation time of the transmission signal from the source node to the destination node; and
 causing a shift signal, representing the transmission signal present at the source node in a first clock cycle, to be shifted from the source node to the destination node through the series of clocked elements one clocked element per predetermined number of clock cycles, with the shift signal always reaching the destination node a fixed number of clock cycles after the first clock cycle, where the clocked elements are arranged by said arranging so that variation in a propagation time of the shift signal from each clocked element to the next clocked element is sufficiently small, relative to the clock period, that a clock cycle in which the shift signal acts as a reset signal and reaches the next clocked element does not vary.

* * * * *